(12) United States Patent
Centen et al.

(10) Patent No.: US 10,270,987 B2
(45) Date of Patent: Apr. 23, 2019

(54) SYSTEM AND METHODS FOR DYNAMIC PIXEL MANAGEMENT OF A CROSS PIXEL INTERCONNECTED CMOS IMAGE SENSOR

(71) Applicant: GVBB HOLDINGS S.A.R.L., Luxembourg (LU)

(72) Inventors: Petrus Gijsbertus Centen, Goirle (NL); Jeroen Rotte, Breda (NL); Juul Josephus Johannes Van Den Heijkant, Breda (NL); Rudolf Van Ree, Breda (NL)

(73) Assignee: GVBB HOLDINGS S.A.R.L., Luxembourg (LU)

(*) Notice: Subject to any disclaimer, the term of this patent is extended or adjusted under 35 U.S.C. 154(b) by 0 days.

(21) Appl. No.: 15/697,349

(22) Filed: Sep. 6, 2017

(65) Prior Publication Data
US 2018/0070029 A1 Mar. 8, 2018

Related U.S. Application Data

(63) Continuation-in-part of application No. 15/362,023, filed on Nov. 28, 2016.
(Continued)

(51) Int. Cl.
*H04N 5/353* (2011.01)
*H04N 5/357* (2011.01)
*H04N 5/232* (2006.01)
*H04N 5/343* (2011.01)
*H04N 5/378* (2011.01)
*H04N 5/3745* (2011.01)

(52) U.S. Cl.
CPC ......... *H04N 5/343* (2013.01); *H04N 5/23216* (2013.01); *H04N 5/3532* (2013.01);
(Continued)

(58) Field of Classification Search
None
See application file for complete search history.

(56) References Cited

U.S. PATENT DOCUMENTS 8,471,315 B1 6/2013 Hynecek et al.
2005/0057674 A1 3/2005 Krymski et al.
(Continued)

FOREIGN PATENT DOCUMENTS

EP 1139658 A2 5/2005
JP 2010268529 A 11/2010

OTHER PUBLICATIONS

International Search Report & Written Opinion issued in PCT/EP2017/072630 dated Nov. 28, 2017.
(Continued)

*Primary Examiner* — Mark T Monk
(74) *Attorney, Agent, or Firm* — Arent Fox LLP

(57) ABSTRACT

A camera using a CMOS image sensor based on a shared pixel array technology avails both high definition (HD) and ultra-high definition (UHD) resolution mode formats. Dynamic pixel management allows for both sequential and binned timing formats of pixel signals using switched capacitor noise reduction techniques. When UHD resolution mode is selected, noise can be reduced using both digital double sampling (DDS) or differential digital double sampling (dDDS), and when HD resolution mode is selected noise can be reduced using DDS. Additionally, both rolling shutter and global shutter modes can be selected when HD resolution mode is selected.

29 Claims, 22 Drawing Sheets

Related U.S. Application Data

(60) Provisional application No. 62/385,027, filed on Sep. 8, 2016, provisional application No. 62/385,204, filed on Sep. 8, 2016.

(52) U.S. Cl.
CPC .......... *H04N 5/3575* (2013.01); *H04N 5/378* (2013.01); *H04N 5/3745* (2013.01)

(56) References Cited

U.S. PATENT DOCUMENTS

| | | |
|---|---|---|
| 2009/0108176 A1 | 4/2009 | Blanquart |
| 2010/0309340 A1 | 12/2010 | Border et al. |
| 2013/0057744 A1* | 3/2013 | Minagawa ......... H04N 5/35563 348/311 |
| 2014/0263964 A1* | 9/2014 | Yang ................ H04N 5/347 250/208.1 |
| 2014/0333809 A1* | 11/2014 | Bock ................ H04N 5/243 348/294 |
| 2016/0165159 A1 | 6/2016 | Hseih et al. |
| 2016/0353034 A1 | 12/2016 | Mauritzson et al. |

OTHER PUBLICATIONS

Non-Final Office Action dated Apr. 11, 2018, issued in U.S. Appl. No. 15/362,023.

International Search Report and Written Opinion dated Aug. 16, 2018, regarding PCT/CA2018/050636.

* cited by examiner

SYSTEM AND METHODS FOR DYNAMIC PIXEL MANAGEMENT OF A CROSS PIXEL INTERCONNECTED CMOS IMAGE SENSOR

CROSS-REFERENCE TO RELATED APPLICATIONS

This application is a continuation-in-part of U.S. application Ser. No. 15/362,023, filed Nov. 28, 2016, which claims priority to U.S. Provisional Application Ser. No. 62/385,027, filed on Sep. 8, 2016. This application also claims priority to U.S. Provisional Application Ser. No. 62/385,204, filed on Sep. 8, 2016. The entire contents of each of these applications is hereby incorporated by reference herein in their entirety.

TECHNICAL FIELD

The disclosure herein generally relates to digital cameras, and more particularly to cameras using complementary metal oxide semiconductor (CMOS) image sensors.

BACKGROUND

Complementary metal oxide semiconductor ("CMOS") image sensors are widely used in digital cameras to produce digital images by converting optical signals into electrical signals. In operation, CMOS image sensors may convert an optical signal into an electrical signal using a multitude of pixels that each include a photodiode and a read-out circuit. The photodiode generates electric charges using absorbed light, converts the generated electric charges into an analog current, and delivers the analog current to the read-out circuit. The read-out circuit may convert the analog signal into a digital signal and outputs the digital signal.

Certain CMOS image sensor pixel circuits are formed using four transistors and are known and referred to as 4T image sensor pixels or "4T pixels." FIG. 1 illustrates an exemplary design of a 4T pixel 110 connected to a bit-line 120. As shown, the 4T CMOS image sensor pixel 110 includes a photodiode ("PD") that provides the photon to electron conversion, while a floating diffusion ("FD") point provides the electron to voltage conversion. The voltage per electron conversion of the FD is known as conversion gain ("CG") and is an important parameter for CMOS image sensors. Conversion gain boosts the pixel signal relative to the analog noise, thereby reducing the noise floor, and thereby enabling performance at lower light levels.

For such CMOS image sensors, during the analog-to-digital conversion process, a comparator receives an analog voltage and compares the analog voltage with a ramp voltage. In one implementation of a CMOS image sensor, the comparator compares the analog voltage with the ramp voltage, and uses a counter to count until the ramp voltage is greater than an analog voltage. Once the counter stops counting, a count value is digital data corresponding to an analog voltage, that is, the count value is the digital data into which the analog voltage has been converted.

Referring to FIG. 1, the pixel is reset when the reset transistor ("RST") and transfer gate ("TG") are turned on simultaneously, setting both the floating diffusion FD and the photodiode PD to the VDD voltage level. Next, the transfer gate TG is turned off (disconnecting the photodiode PD and floating diffusion FD) and the photodiode PD is left to integrate light.

After integration, the signal measurement occurs. First, the reset transistor RST is turned on and off to reset the floating diffusion FD. Immediately after this, the reset level is sampled from the floating diffusion FD and stored on the column circuit, i.e., bit-line 120. Next, the transfer gate TG is turned on and off which allows charge on the photodiode PD to transfer to the floating diffusion (FD). Once the charge transfer is complete, this charge (the photodiode signal level plus the floating diffusion reset level) is measured and stored on bit-line 120 as well.

These two stored voltages are then differenced ($D_{sig}-D_{rst}$) to determine the photodiode signal level. The 4T pixel design 110 significantly improves the performance of other CMOS image sensors, reducing both read noise and image lag. In addition, the design reduces pixel source follower offsets and the like.

SUMMARY

In one exemplary aspect, an image sensing system is disclosed for providing dynamic pixel management to switch operational modes between high definition (HD) and ultra-high definition. In this aspect, the image sensor includes a complementary metal oxide semiconductor (CMOS) image sensor including a shared pixel array having a plurality of shared pixel units that each comprises at least two photodiodes and a shared floating diffusion; a plurality of vertical and horizontal charge circuitry coupled to the CMOS image sensor and configured to activate the plurality of shared pixel units during image capture based on a set operational mode of the image sensor; and a dynamic pixel manager configured to switch the operational mode of the CMOS image sensor between a UHD mode and a HD mode in response to a user selection of an image resolution for the image captured by the image sensor. Moreover, the image sensing system includes a UHD mode controller configured to control the plurality of vertical and horizontal charge circuitry to sequentially transfer charge between the at least two photodiodes and the shared floating diffusion of each shared pixel unit when the dynamic pixel manager sets the operational mode of the CMOS image sensor to the UHD mode to individually sample output values of each of the at least two photodiode during the image capture by the image sensor; a HD mode controller configured to control the plurality of vertical and horizontal charge circuitry to bin charge concurrently between the at least two photodiodes and the shared floating diffusion of each shared pixel unit when the dynamic pixel manager sets the operational mode of the CMOS image sensor to the HD mode to collectively sample output values of each shared pixel unit that combines output values of the at least two photodiodes during the image capture by the image sensor; a column readout circuit having a plurality of storage capacitors selectively coupled to the shared pixel array that are each configured to store sampled output values of the at least two photodiode of each shared pixel unit during the image capture in the UHD mode and to store sampled output values of each shared pixel unit during the image capture in the HD mode; and an image generating unit configured to generate image data based on the stored sampled output values in the plurality of storage capacitors, the generated image configured to be displayed on a display device.

In another exemplary embodiment, a camera is disclosed for providing dynamic pixel management to switch operational modes between high definition (HD) and ultra-high definition. In this aspect, the camera includes an image sensor including a shared pixel array having a plurality of shared pixels that each comprises at least two photodiodes and a shared floating diffusion; a dynamic pixel manager configured to switch an operational mode of the image sensor between a UHD mode and a HD mode based on a selected image resolution for an image capture by the image sensor; a UHD mode controller configured to control the image sensor to sequentially transfer charge between the at least two photodiodes and the shared floating diffusion of each shared pixel when the dynamic pixel manager sets the operational mode of the image sensor to the UHD mode to individually sample photodiode output values of each of the at least two photodiode during the image capture by the image sensor; a HD mode controller configured to control the image sensor to bin charge concurrently between the at least two photodiodes and the shared floating diffusion of each shared pixel when the dynamic pixel manager sets the operational mode of the image sensor to the HD mode to collectively sample pixel output values of each shared pixel that combines output values of the at least two photodiodes during the image capture by the image sensor; and an image generating unit configured to generate image data based on at least one of the individually sampled photodiode output values during the UDH mode and the collectively sampled pixel output values during the HD mode.

In another aspect, a camera is disclosed for providing dynamic pixel management to switch operational modes between high definition (HD) and ultra-high definition. In this aspect, the camera includes a camera mode controller configured to switch the camera between a UHD mode and a HD mode based on a selected image resolution for an image capture; and an image sensor configured to individually sample sub-pixels of each pixel in an image sensor when the camera mode controller sets the camera to the UHD mode for the image capture and to collectively sample the sub-pixels of each pixel in the image sensor when the camera mode controller sets the camera to the HD mode for the image capture.

Other aspects of apparatuses described herein will become readily apparent to those skilled in the art based on the following detailed description, wherein various aspects of memory are shown and described by way of illustration. These aspects may be implemented in many different forms and its details may be modified in various ways without deviating from the scope of the present invention. Accordingly, the drawings and detailed description provided herein are to be regarded as illustrative in nature and not as restricting the scope of the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
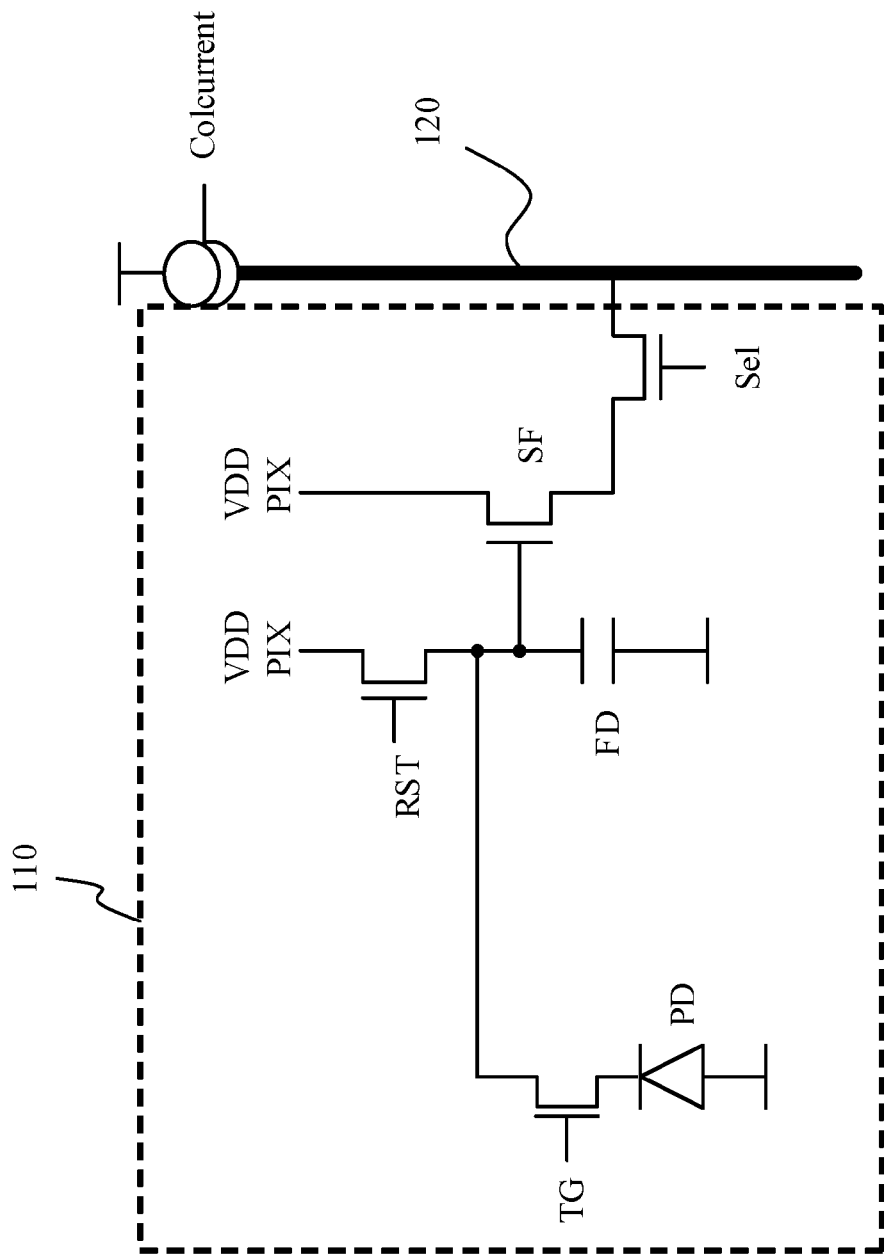
FIG. 1 illustrates a conventional design of a 4T pixel configuration of a CMOS image sensor connected to a column circuit.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In one configuration, the number of rows and columns of photodiodes in a pixel array of a CMOS image sensor may both be doubled. As a result, there may be four time of photodiodes in an image area compared with the number of photodiodes when the image area is filled with 4T pixels. In such a configuration, each pixel area that may originally be occupied by one 4T pixel may contain four photodiodes. Such a pixel that contains four photodiodes may be referred to as a 4T shared pixel, a shared pixel, and/or a shared pixel unit.

Figure 2:
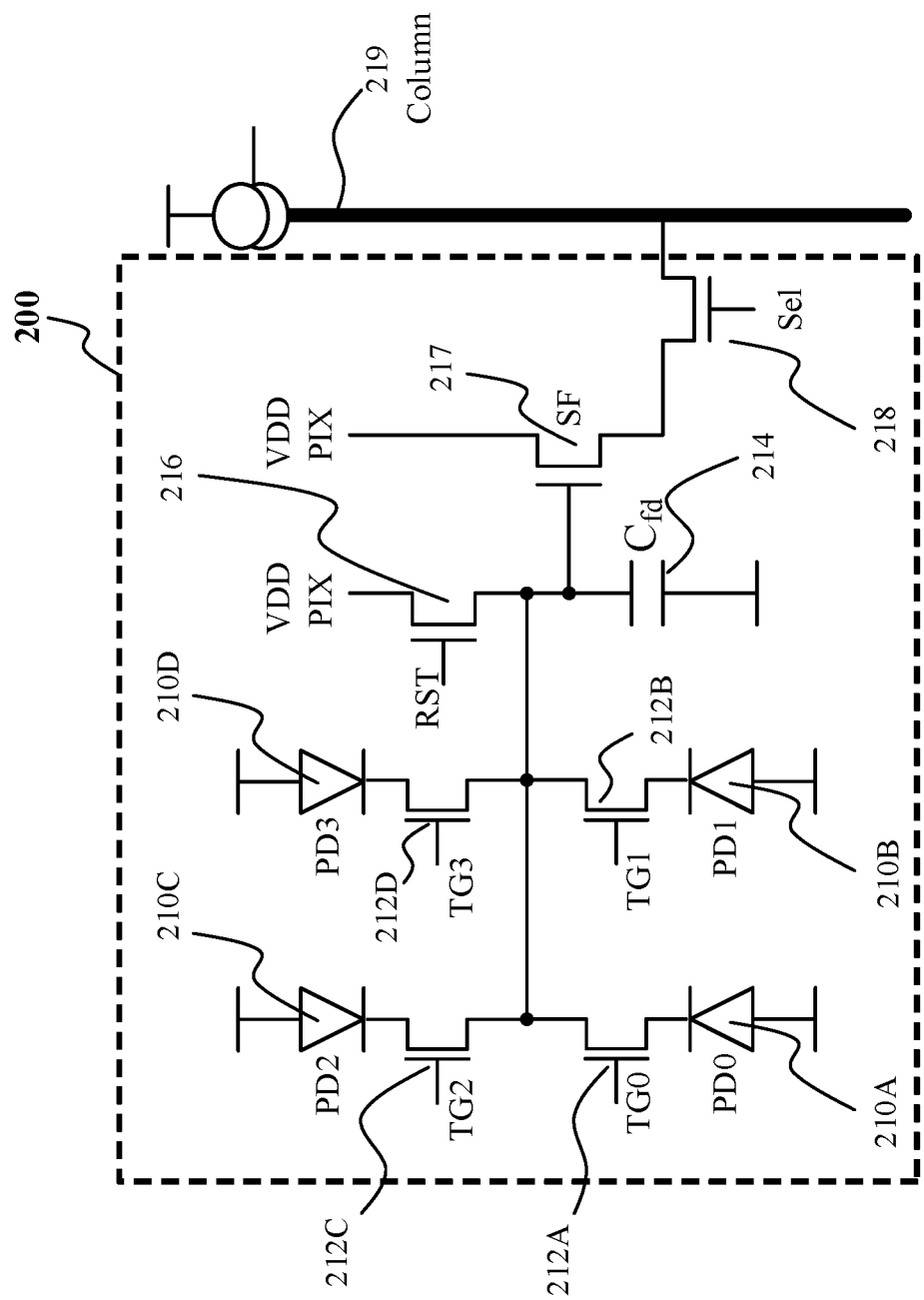
FIG. 2 illustrates a schematic diagram of an exemplary 4T shared pixel CMOS image sensor that can be implemented in connection with an exemplary embodiment.

FIG. 2 illustrates a schematic diagram of an exemplary 4T shared pixel CMOS image sensor that can be implemented in connection with an exemplary embodiment. The shared pixel 200 includes a similar configuration as the 4T pixel described above except that it includes four sub-pixels, e.g., photodiodes 210A, 210B, 210C and 210D (also shown as PD0-PD3) that are each driven by a respective transfer gate (shown as TG0-TG3). The transfer gates, which are CMOS transistors, are identified by reference numerals 212A, 212B, 212C and 212D. As shown, each of the transfer gates 212A-112D shares a common readout circuit and is connected to floating diffusion point, 214, i.e., capacitor $C_{fd}$. As further shown, both transistor 216 (reset transistor) and transistor 217 have drains connected to the voltage source of the pixel (e.g., VDD PIX). The source of reset transistor 216 is connected to the floating diffusion point 214 and the source of transistor 217 is connected to the drain of the select transistor 218. The source of select transistor 218 is connected to the column circuit 219.

As will be discussed in more detail below, each sub-pixel (i.e., each of photodiodes PD0-PD3) can be read out separately by activating its corresponding transfer gate. Thus, to read out photodiode 210A, the transfer gate 212A is turned on/activated. Similarly, photodiode 210B is read out by activating transfer gate 212B, and so forth. In some instances, multiple sub-pixels will be read out at the same time as a single read operation by activating the respective transfer gates simultaneously.

In order to take advantage of the higher resolution provided by the shared pixels, each photodiode of a shared pixel may need to be read out individually. To read out each photodiode of a shared pixel individually, four wires may be needed to addressed each photodiodes individually. Having four wires connected to a shared pixel may degrade the performance of the shared pixel, e.g., by blocking the optical paths of the shared pixel, and/or by detrimentally affecting the conversion gain, fill factor, sensitivity of the image sensor. Thus, it may be desirable to reduce the interconnection/wiring associated with a shared pixel while maintaining the capability to read out each photodiode of the shared pixel individually.

Figure 3:
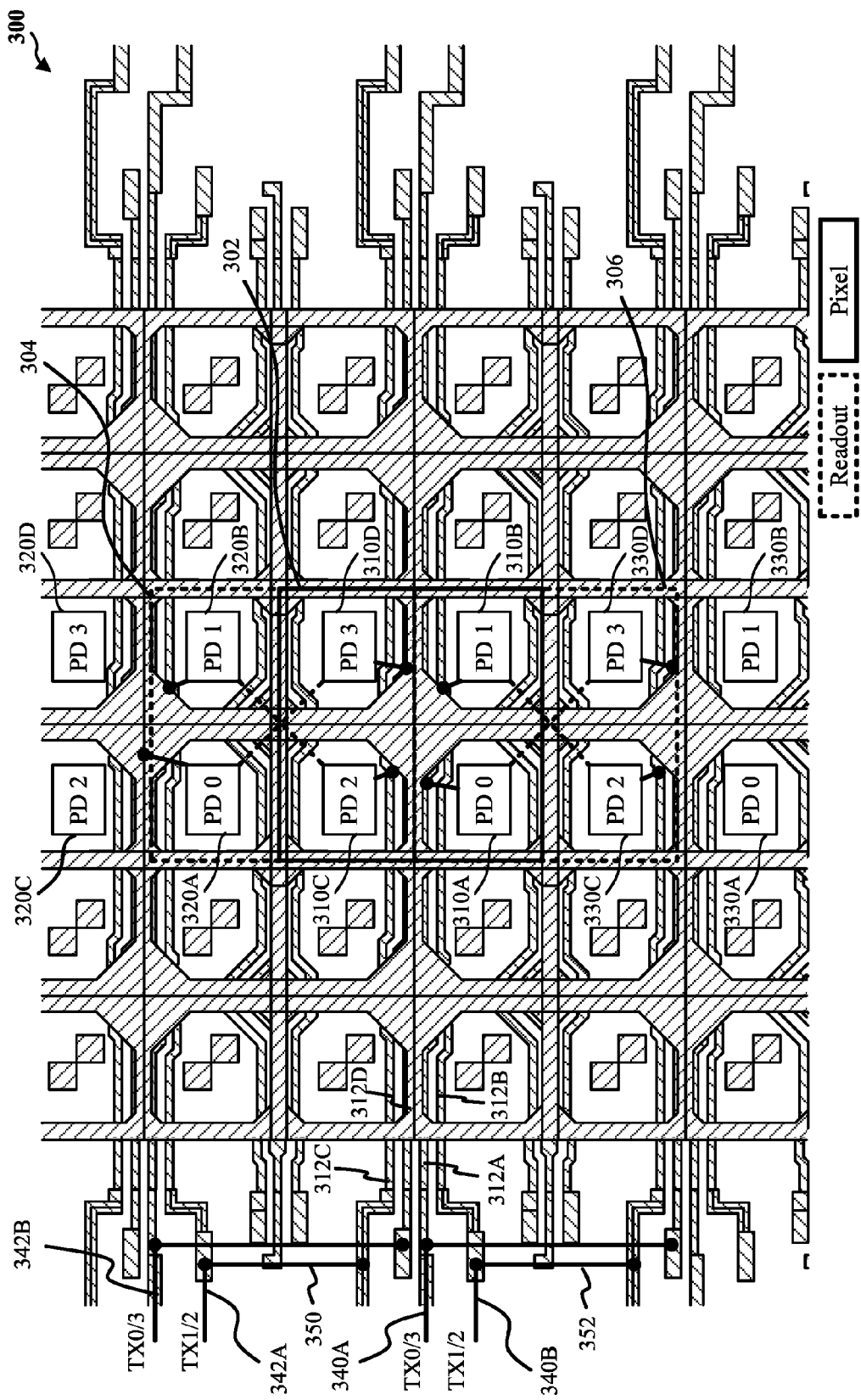
FIG. 3 illustrates a top-down view of a portion of a pixel array according to an exemplary embodiment.

FIG. 3 illustrates a top-down view of a portion of a pixel array 300 according to an exemplary embodiment. The pixel array 300 includes a multitude of shared pixels described above. For example, as shown in the middle of the exemplary pixel array 300, a shared pixel 302 is shown as a solid dark square and includes sub-pixels (i.e., photodiodes PD0-PD3) identified as photodiodes 310A-310D. As further shown, a shared pixel including photodiodes 320A, 320B, 320C and 320D is shown in the array row above the row of the shared pixel 302 and another shared pixel including photodiodes 330A, 330B, 330C and 330D is shown in the array row below the row of the shared pixel 302. In one configuration, each of the shared pixel 302, and the shared pixels above and below the shared pixel 302 may be the shared pixel 200 described above in FIG. 2.

According to the exemplary embodiment, the pixel array 300 shows a three by three array of 4T shared pixels. The pixel array 300 can be a portion of an array with 1125 rows, and each row can comprise two sub-pixels (i.e. photodiodes PD0 and PD2). Thus, each row may comprise vertical shift registers that are two by 1125 lines deep, i.e., 2250 lines. Additionally, because there are a total of four sub-pixels (i.e. photodiodes PD0-PD3), an array with 1125 rows can provide a total of 4500 sub-pixel signals or voltages, each of which are to be readout by the platform and/or camera system using the pixel array 300. A camera system or platform using digital double sampling (DDS) may be further required to readout both a dark signal and a bright signal per image; thus, a platform may be required to readout a total of two times 4500 sub-pixel signals (9000 sub-pixel signals) per image. According to the teachings herein, another readout method, differential DDS (dDDS) can be advantageously used to further reduce the number of required readouts from 9000 to 6750.

As further shown, each of the photodiodes of pixel 302 are connected to its respective transfer gate as described above. Thus, photodiode 310A is connected to transistor 312A, photodiode 310B is connected to transistor 312B, photodiode 310C is connected to transistor 312C, and photodiode 310D is connected to transistor 312D. Although pixel 302 is illustrated with a solid line square, the pixel array 300 provides a cross connection of pixels such that sub-pixels of adjacent pixels are read out concurrently to minimize bandwidth. Each readout is illustrated with dashed lines and boxes. Thus, the sub-pixels forming the grouping of sub-pixels 306 may be read out first followed by the grouping of sub-pixels 304, as will become readily apparent based on the following disclosure.

Thus, photodiode 310C (PD2) of the shared pixel 302 may be read out concurrently when photodiode 320B (PD1) of the shared pixel in the row above is read out. In one configuration, photodiode 310C (PD2) may be read out during a first clock cycle, and photodiode 320B (PD1) may be read out during a second clock cycle. The first clock cycle and the second cycle may be consecutive clock cycles. Similarly, photodiode 310D (PD3) of the shared pixel 302 may be read out concurrently when photodiode 320A (PD0) of the shared pixel in the row above is read out. In one configuration, photodiode 310D (PD3) may be read out during a first clock cycle, and photodiode 320A (PD0) may be read out during a second clock cycle. The first clock cycle and the second cycle may be consecutive clock cycles.

Moreover, when photodiode 310A (PD0) of pixel 302 is read out, photodiode 330D (PD3) of the shared pixel in the row below may also get read out. In one configuration, photodiode 310A (PD0) may be read out during a first clock cycle, and photodiode 330D (PD3) may be read out during a second clock cycle. The first clock cycle and the second cycle may be consecutive clock cycles. Similarly, when photodiode 310B (PD1) of pixel 302 is readout, photodiode 330C (PD2) of the shared pixel in the row below may also get read out. In one configuration, photodiode 310B (PD1) may be read out during a first clock cycle, and photodiode 330C (PD2) may be read out during a second clock cycle. The first clock cycle and the second cycle may be consecutive clock cycles.

As explained above with reference to FIG. 2, to read out a value of a particular photodiode, the respective transfer gate must be activated. In this instance, transfer gate signals are applied to sub-pixels in adjacent rows, to read out two values concurrently. For example, as shown a transfer gate signal $TG_{0/3}$ (i.e., signal 340A) is applied to transistor 312A, such that the sub-pixel 310A can be read out as shown above. As further shown, this transfer gate signal 340A is also applied to the transfer gate for photodiode 330D on the adjacent row below the row of the shared pixel 302. During the same readout period that the transfer gate signal 340A is activated, the control circuit also activates transfer gate signal 340B, which activates the transfer gates for photodiode 310B of the shared pixel 302 and photodiode 330C (i.e., PD2) of the shared pixel directly below the shared pixel 302. As shown, transfer gate signal 340A and transfer gate signal 340B are in the same row of the shift register.

Furthermore, during the next readout period, transfer gate signals 342A and 342B will be applied in a similar manner. Transfer gate signals 342A activates the transfer gates for photodiode 310C of the shared pixel 302 and photodiode 320B of the shared pixel directly above the shared pixel 302 in the pixel array 300. Similarly, transfer gate signals 342B activates the transfer gates for photodiode 310D of the shared pixel 302 and photodiode 320A of the shared pixel directly above the shared pixel 302 in the pixel array 300.

Figure 4:
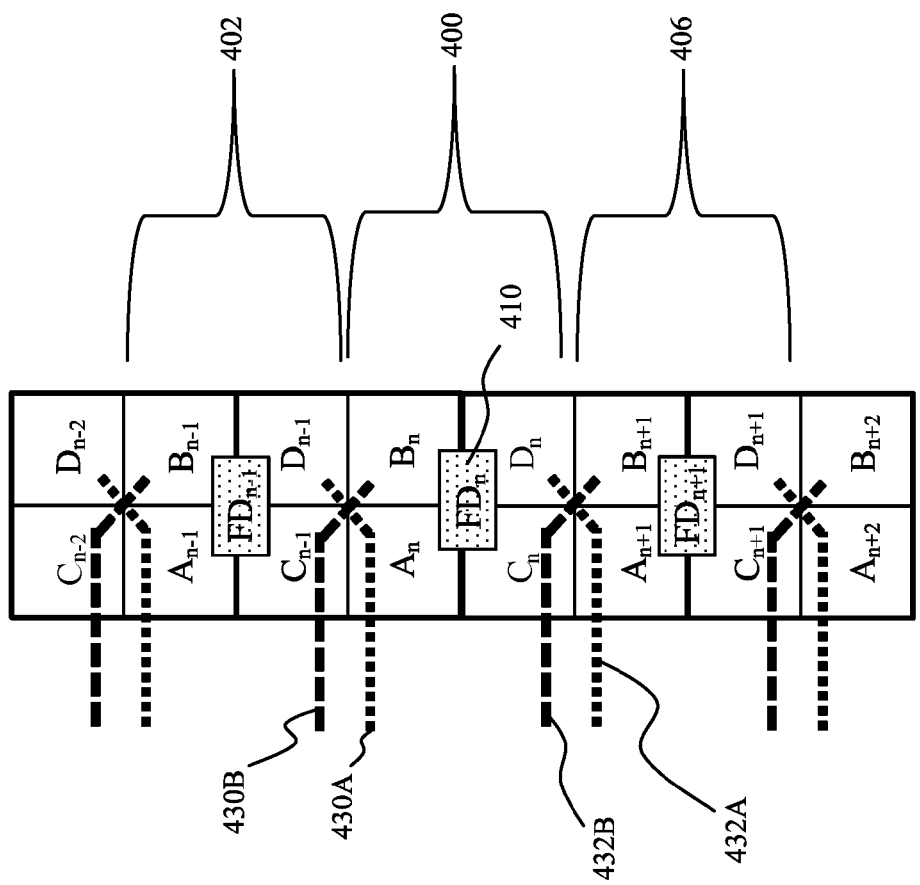
FIG. 4 illustrates a block diagram of a conceptual view of a portion of the pixel array shown in FIG. 3.

In one configuration, the interconnections (e.g., 350 and 352) that cross-couple transfer gates of two different shared pixels may be located at the edge of the image area, as illustrated in FIG. 4. In one configuration, the interconnections (e.g., 350 and 352) that cross-couple transfer gates of two different shared pixels may be located in the pixel grid (e.g., in the shared pixel 302 and the shared pixel above or below the shared pixel 302), thus reducing the amount of shift registers on the edge of the image area.

FIG. 4 illustrates a block diagram of a conceptual view of a portion of the pixel array shown in FIG. 3. In particular, the column shown in this figure includes a shared pixel 400 that includes sub-pixels $A_n$, $B_n$, $C_n$ and $D_n$. In one configuration, the shared pixel 400 may be the shared pixel 200 or 302 discussed above, and the sub-pixels $A_n$, $B_n$, $C_n$ and $D_n$ may correspond to sub-pixels 210A-210D or 310A-310D discussed above. Moreover, as described above, each 4T shared pixel includes a floating diffusion point, which is illustrated as $FD_n$ and denoted by 410. As further shown, a shared pixel 402 in the preceding row is formed by sub-pixels $A_{n-1}$, $B_{n-1}$, $C_{n-1}$ and $D_{n-1}$ (including floating diffusion point $FD_{n-1}$) and two sub-pixels $C_{n-2}$ and $D_{n-2}$ are formed above the shared pixel 402. Similarly, the row following the shared pixel 400 includes a shared pixel 406 formed by sub-pixels $A_{n+1}$, $B_{n+1}$, $C_{n+1}$ and $D_{n+1}$ (including floating diffusion point $FD_{n+1}$), and two sub-pixels $A_{n+2}$ and $B_{n+2}$ are formed below the shared pixel 406. For purposes of this disclosure, the row for each shared pixel can be considered as rows n−2, n−1, n, n+1 and n+2. For example, the shared pixel 400 is on row n, the shared pixel 402 is on row n−1, and the shared pixel 406 is on row n+1.

As described above, each transfer gate is activated for two adjacent sub-pixels in the vertical direction (relative to the array) that are in different adjacent pixel rows (e.g., in rows n−1 and n, or in rows n and n+1). Thus, the transfer gates for sub-pixels $C_{n-1}$ and $B_n$ may first be activated by transfer gate signal 430B. Since sub-pixels $C_{n-1}$ and $B_n$ are in different rows, i.e., different shared pixels, the values of the sub-pixels $C_{n-1}$ and $B_n$ may be read out during the same readout period. Next, a transfer gate signal 430A may be applied to activate sub-pixels $A_n$ and $D_{n-1}$. After the activation by the pair of transfer gate signals 430A and 430B, the CMOS image sensor has performed a readout of sub-pixels $A_n$, $B_n$, $C_{n-1}$, and $D_{n-1}$. It should be appreciated that this readout may correspond to the dashed box 306 shown in FIG. 3 in which sub-pixel 310A (e.g., $A_n$), sub-pixel 310B (e.g., $B_n$), sub-pixel 330C (e.g., $C_{n-1}$), and sub-pixel 330D (e.g., $D_{n-1}$), are all read out during one readout period.

Referring back to FIG. 4, during the next cycle of readout, transfer gate signals 432B and 432A may be applied to activate the corresponding sub-pixels. In a similar manner as described above, the transfer gates for sub-pixels $C_n$ and $B_{n+1}$ may first be activated by transfer gate signal 432B. Next, transfer gate signal 432A may be applied to activate sub-pixels $A_{n+1}$ and $D_n$. Accordingly, after the activation by the pair of transfer gate signals 432A and 432B, the CMOS image sensor has performed a readout of sub-pixels $C_n$, $D_n$, $A_{n+1}$ and $B_{n+1}$.

Figure 5:
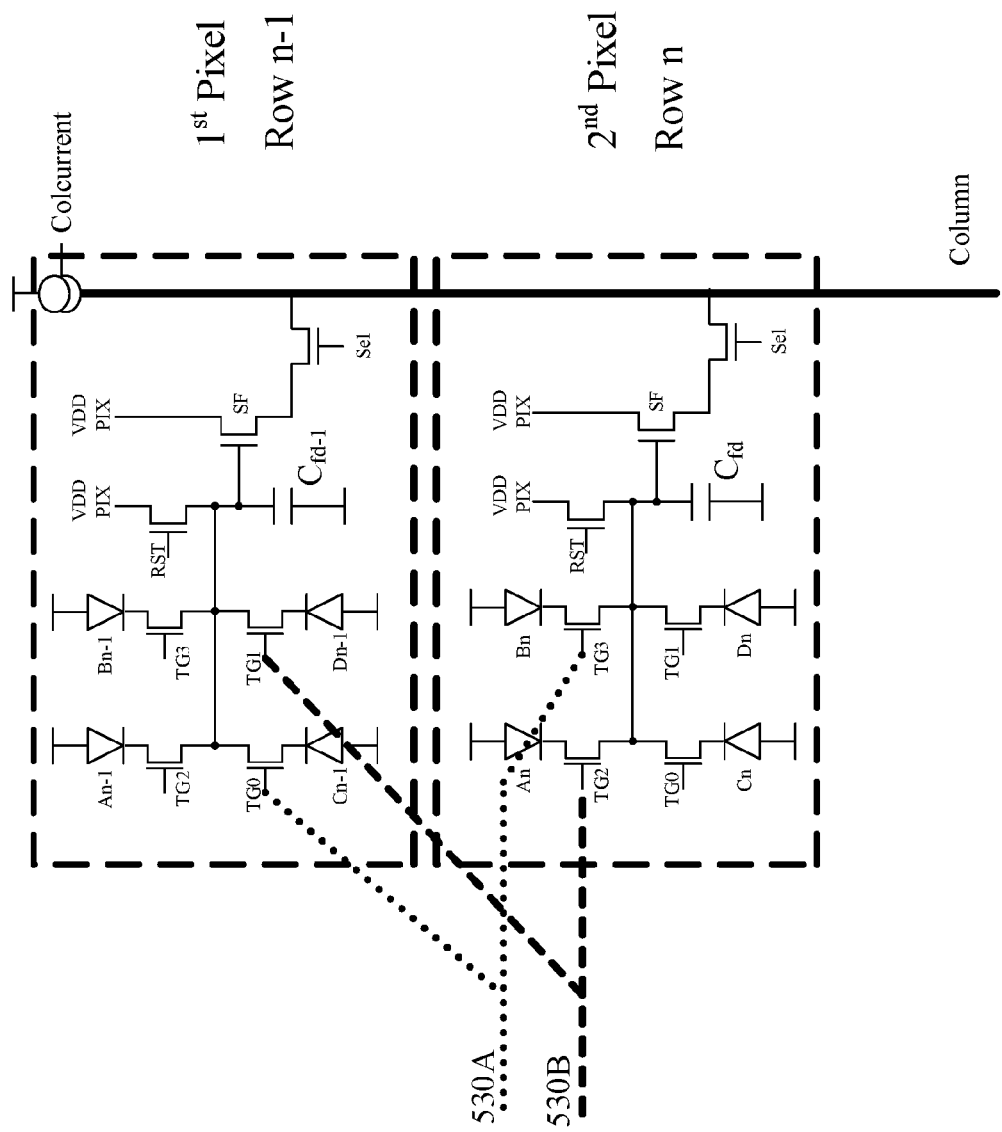
FIGS. 5 and 6 illustrate schematic diagrams of a plurality of 4T shared pixels in a pixel array of an image sensor according to an exemplary embodiment.
Figure 6:
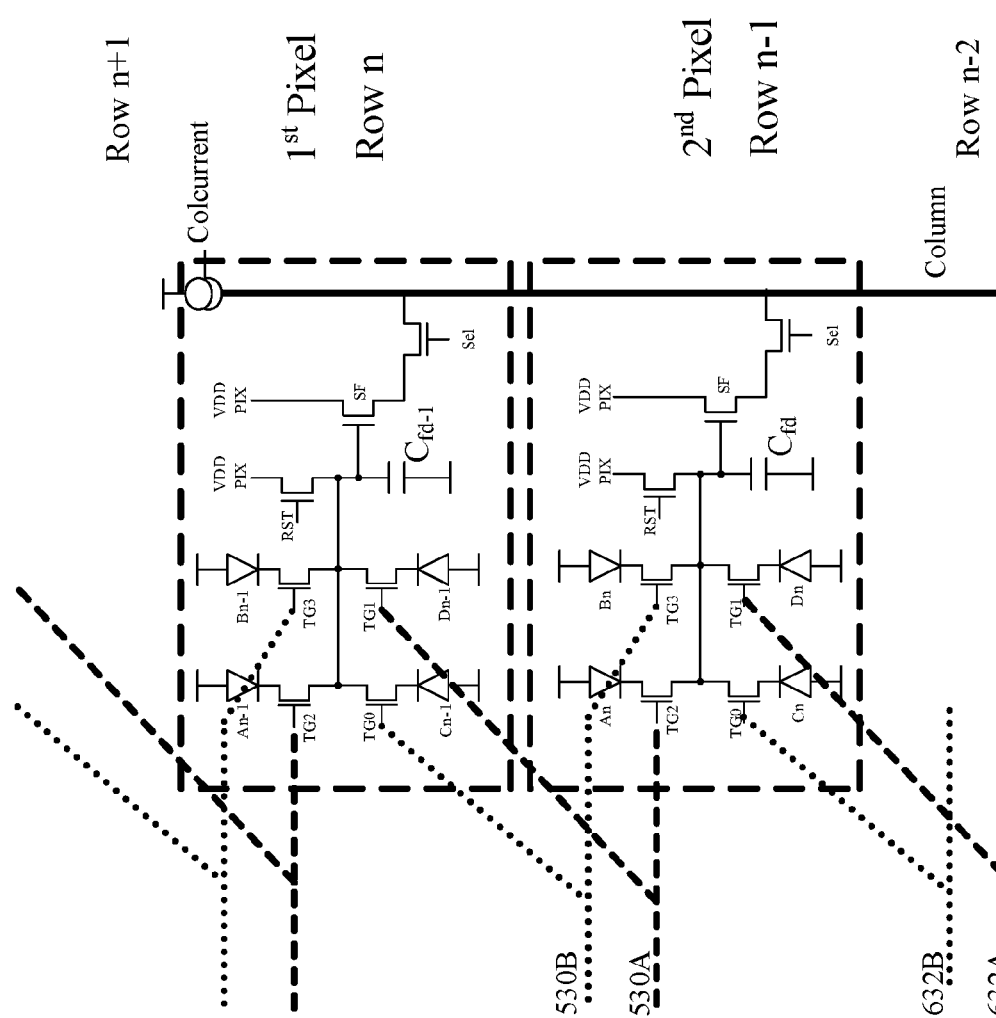

FIGS. 5 and 6 illustrate schematic diagrams of a plurality of 4T shared pixels in a pixel array of an image sensor according to an exemplary embodiment. As shown in FIG. 5, the pixel array includes a pair of adjacent rows, i.e., 1st pixel row n−1 and 2nd pixel row n, in the vertical direction of the pixel array. It should be appreciated that each separate shared pixel in row n and n−1 includes the same 4T shared transistor circuit configuration discussed above with respect to FIG. 2 and will not be repeated herein. As shown, one transfer gate signal 530A may be applied to the transfer gate (TG0) of sub-pixel $C_{n-1}$ and to the transfer gate (TG3) of sub-pixel $B_n$. Similarly, another transfer gate signal 530B may be applied to the transfer gate (TG2) of sub-pixel $A_n$ and to the transfer gate (TG1) of sub-pixel $D_{n-1}$. In one configuration, the transfer gate signals 530A and 530B may be the transfer gate signals 340A and 340B, 342A and 342B, 430A and 430B, or 432A and 432B described above.

FIG. 6 illustrates the same pixel array circuit diagram as in FIG. 5 and also shows application of additional transfer gate signals 632A and 632B, which are the same transfer gate signals described above. In both FIGS. 5 and 6, the output of each sub-pixel is connected to the column circuit to provide readouts.

Figure 7:
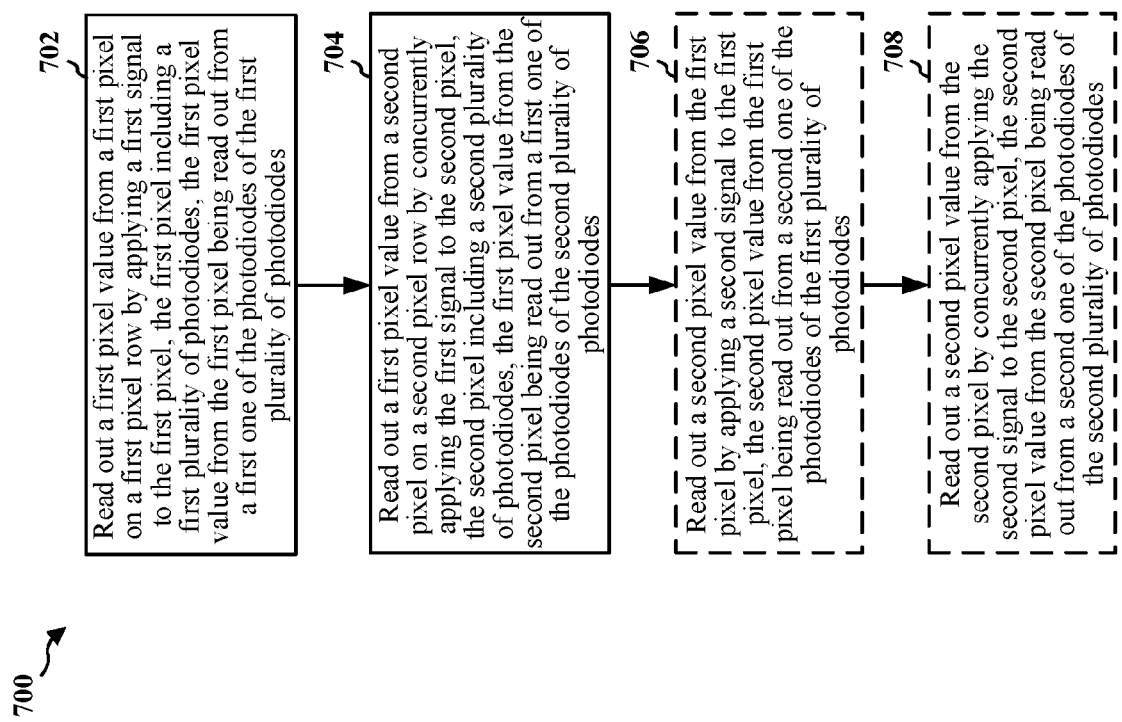
FIG. 7 is a flowchart of a method of performing digital sampling of pixel values of a CMOS image sensor.

FIG. 7 is a flowchart 700 of a method of performing digital sampling of pixel values of a CMOS image sensor. The method may be performed by an apparatus that includes a CMOS image sensor. The CMOS image sensor may include a pixel array, which may include a multitude of shared pixels as described above. At 702, the apparatus may read out a first pixel value from a first pixel (e.g., the shared pixel 400) on a first pixel row by applying a first signal (e.g., the transfer gate signal 430A) to the first pixel. The first pixel may include a first plurality of photodiodes. The first pixel value from the first pixel may be read out from a first one of the photodiodes of the first plurality of photodiodes (e.g., $A_n$).

At 704, The apparatus may read out a first pixel value from a second pixel (e.g., the shared pixel 402) on a second pixel row by concurrently applying the first signal (e.g., the transfer gate signal 430A) to the second pixel. The second pixel may include a second plurality of photodiodes. The first pixel value from the second pixel may be read out from a first one of the photodiodes of the second plurality of photodiodes (e.g., $D_{n-1}$).

In one configuration, the first pixel row may be adjacent to the second pixel row, and the first pixel may be adjacent to the second pixel. In one configuration, the first one of the photodiodes of the first plurality of photodiodes (e.g., $A_n$) and the first one of the photodiodes of the second plurality of photodiodes (e.g., $D_{n-1}$) may be on different columns. In one configuration, the first pixel value from the first pixel may be read out during a first clock cycle, and the first pixel value from the second pixel may be read out during a second clock cycle. The first clock cycle and the second clock cycles may be consecutive clock cycles.

At 706, the apparatus may optionally read out a second pixel value from the first pixel (e.g., the shared pixel 400) by applying a second signal (e.g., the transfer gate signal 430B) to the first pixel. The second pixel value from the first pixel may be read out from a second one of the photodiodes of the first plurality of photodiodes (e.g., $B_n$).

At 708, the apparatus may optionally read out a second pixel value from the second pixel (e.g., the shared pixel 402) by concurrently applying the second signal (e.g., the transfer gate signal 430B) to the second pixel. The second pixel value from the second pixel may be read out from a second one of the photodiodes of the second plurality of photodiodes (e.g., $C_{n-1}$).

In one configuration, the second one of the photodiodes of the first plurality of photodiodes (e.g., $B_n$) and the second one of the photodiodes of the second plurality of photodiodes (e.g., $C_{n-1}$) may be on different columns. In one configuration, the second pixel value from the first pixel may be read out during a first clock cycle, and the second pixel value from the second pixel may be read out during a second clock cycle. The first clock cycle and the second clock cycles may be consecutive clock cycles.

In one configuration, the apparatus may include a first row of pixels including a first pixel (e.g., the shared pixel 402). The first pixel may include a first plurality of photodiodes and a first plurality of transfer gates. Each of the first plurality of photodiodes may be associated with a corresponding one of the first plurality of transfer gates. The apparatus may include a second row of pixels including a second pixel (e.g., the shared pixel 400). The second pixel may include a second plurality of photodiodes and a second plurality of transfer gates. Each of the second plurality of photodiodes may be associated with a corresponding one of the second plurality of transfer gates. A first one of the transfer gates of the first plurality of transfer gates (e.g., the transfer gate associated with $D_{n-1}$) may be coupled to a first one of the transfer gates of the second plurality of transfer gates (e.g., the transfer gate associated with $A_n$).

In one configuration, the connection for coupling the first one of the transfer gates of the first plurality of transfer gates (e.g., the transfer gate associated with $D_{n-1}$) and the first one of the transfer gates of the second plurality of transfer gates (e.g., the transfer gate associated with $A_n$) may be at the edge of an image area. The image area may include the first row of pixels and the second row of pixels. In one configuration, the connection for coupling the first one of the transfer gates of the first plurality of transfer gates (e.g., the transfer gate associated with $D_{n-1}$) and the first one of the transfer gates of the second plurality of transfer gates (e.g., the transfer gate associated with $A_n$) may be at the first pixel (e.g., the shared pixel 402) and the second pixel (e.g., the shared pixel 400).

In one configuration, a first one of the photodiodes of the first plurality of photodiodes (e.g., $D_{n-1}$) may be associated with the first one of the transfer gates of the first plurality of transfer gates, and a first one of the photodiodes of the second plurality of photodiodes is associated with the first one of the transfer gates of the second plurality of transfer gates (e.g., $A_n$). In one configuration, the first one of the photodiodes of the first plurality of photodiodes (e.g., $D_{n-1}$) and the first one of the photodiodes of the second plurality of photodiodes (e.g., $A_n$) may be on different columns. In one configuration, the first row of pixels may be adjacent to the second row of pixels. The first pixel may be adjacent to the second pixel.

In one configuration, a second one of the transfer gates of the first plurality of transfer gates (e.g., the transfer gate associated with $C_{n-1}$) may be coupled to a second one of the transfer gates of the second plurality of transfer gates (e.g., the transfer gate associated with $B_n$). In one configuration, the connection for coupling the second one of the transfer gates of the first plurality of transfer gates (e.g., the transfer gate associated with $C_{n-1}$) and the second one of the transfer gates of the second plurality of transfer gates (e.g., the transfer gate associated with BO may be at the edge of an image area. The image area may include the first row of pixels and the second row of pixels. In one configuration, the connection for coupling the second one of the transfer gates of the first plurality of transfer gates (e.g., the transfer gate associated with $C_{n-1}$) and the second one of the transfer gates of the second plurality of transfer gates (e.g., the transfer gate associated with $B_n$) may be at the first pixel (e.g., the shared pixel 402) and the second pixel (e.g., the shared pixel 400).

In one configuration, the apparatus may further include a third row of pixels comprising a third pixel (e.g., the shared pixel 406). The third pixel may include a third plurality of photodiodes and a third plurality of transfer gates. Each of the third plurality of photodiodes may be associated with a corresponding one of the transfer gates of the third plurality of transfer gates.

In one configuration, the second row of pixels may be adjacent to the third row of pixels, and the second row of pixels may be located between the first row of pixels and the third row of pixels. In one configuration, the second pixel (e.g., the shared pixel 400) may be adjacent to the third pixel (e.g., the shared pixel 406). In one configuration, the second pixel (e.g., the shared pixel 400) may be located between the first pixel (e.g., the shared pixel 402) and the third pixel (e.g., the shared pixel 406).

In one configuration, a third one of the transfer gates of the second plurality of transfer gates (e.g., the transfer gate associated with $C_n$) may be coupled to a first one of the transfer gates of the third plurality of transfer gates (e.g., the transfer gate associated with $B_{n+1}$). In one configuration, a fourth one of the transfer gates of the second plurality of transfer gates (e.g., the transfer gate associated with $D_n$) may be coupled to a second one of the transfer gates of the third plurality of transfer gates (e.g., the transfer gate associated with $A_{n+1}$). In one configuration, the connection for cross coupling the transfer gates may be at the edge of an image area. The image area may include the second row of pixels and the third row of pixels. In one configuration, the connection for cross coupling the transfer gates may be at the second pixel (e.g., the shared pixel 400) and the third pixel (e.g., the shared pixel 406).

Figure 8:
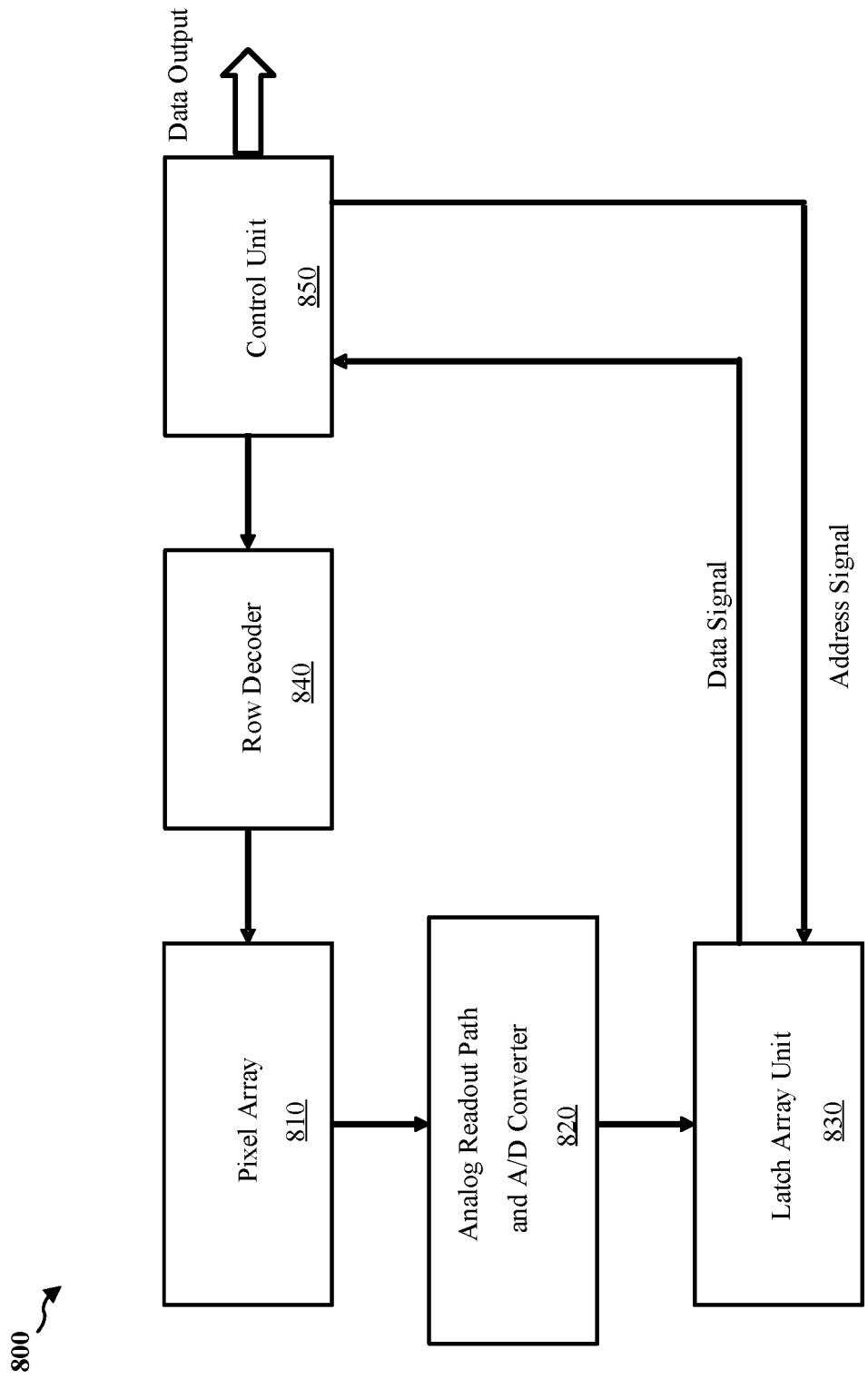
FIG. 8 illustrates a block diagram of a CMOS image sensor according to an exemplary embodiment.

FIG. 8 illustrates a block diagram of a CMOS image sensor according to an exemplary embodiment. As shown, the CMOS image sensor 800 includes a pixel array 810, which can be, for example, pixel array 300 described above that includes a multitude of 4T shared pixel configurations. Furthermore, the output of the pixel array 810 may be fed to an analog readout path and A/D converter 820, which is provided for processing the analog output voltages from the pixel array 810 to convert analog pixel signals into digital signals. It should be understood that the analog readout path and A/D converter 820 is known to those skilled in the art.

As further shown, a latch array unit (or line buffer) 830 is provided for storing the digital signals outputted from the analog readout path and A/D converter 820. It should be appreciated that the line buffer 830 can include multiple lines depending on the readout order of the pixels of pixel array 810. Moreover, a control unit 850 is provided for providing control signals used in controlling the aforementioned units and outputting data to the outside (e.g., a display unit) through an interface. For example, the control unit 850 in conjunction with row decoder 840 can generate the activating signals. Moreover, in one embodiment, the control unit 850 can also generate the control signals to open and close the switches of the capacitor readout.

The control unit 850 may include one or more processors and one or more modules for executed the control algorithms described herein. The modules may be software modules running in the processor, or resident/stored in memory, one or more hardware modules coupled to the processor, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Furthermore, the control unit 850 may be coupled to a row decoder 840 that is configured to output the signals for selecting the rows in the pixel array 810 based on a control signal transmitted from the control unit 850. Moreover, the control unit can include an image generating unit configured to generate image data (i.e., the "data output") based on the stored sampled output values in the plurality of storage capacitors, i.e., the received "data signal", of which the generated image can be configured to be displayed on a display device as should be appreciated to one skilled in the art.

Preferably, the analog readout path and A/D converter 820 may include comparators as many as the number of columns of the pixel array 810 as described above. Each of the comparators serves a role of converting an analog pixel value of a column in which it is located into a digital signal. The digital signal is stored in the latch array unit 830 including latches as many as the number of the columns of the pixel array 810. The digital signals stored in the latch array unit 830 are subjected to an image processing by the control unit 850 and then, sequentially outputted through output pins of the image sensor in the image processed order.

According to the disclosure herein, the exemplary method and sensor provide for an efficient readout of pixel values from a pixel array that reduces the required output bandwidth and enables digital double sampling through the whole analog chain of the pixel array. Moreover, using the disclosed technique, effects like Black sun and fluctuating analog disturbances are avoided and suppressed.

In one configuration, to reduce interconnections in the pixel or pixel array, two transfer gates belonging to two different shared pixels (e.g., two shared pixels on two adjacent rows) may be connected. As a result, two floating diffusions of the two shared pixels are read out at the same time (e.g., during the same readout period). By cross coupling two transfer gates on two different rows, two shared pixels may be operated in parallel. This configuration may reduce the amount of wiring needed for the vertical shift registers for addressing the pixels or sub-pixels. For example, for a shared pixel with four photodiodes, the number of interconnections to address the shared pixel may be reduced from four wires to two wires. With reduced wiring in the shared pixel, the pixel performance (e.g., conversion gain, fill factor, sensitivity of the shared pixel) may improve due to lower complexity in wiring.

It should be appreciated that in the examples above, all switching signals are assumed to be positive logic signals, i.e. a high level, or "1" results in closing the switch. It is, however, also possible to use an inverted logic, or to use both, positive and negative, logic in a mixed manner. Moreover, the disclosed CMOS image sensor and method provides an increased speed of the overall readout circuit. In one aspect, the increase in the speed of the readout circuit allows for an increase in the number of pixels in a matrix, which is a key feature for high definition imaging.

Dynamic Pixel Management of a CMOS Image Sensor

Camera resolution and shutter operation determine, in part, the quality of a camera. Camera resolution can be related to the number of pixels used to capture an image while shutter operation can relate to how the exposed information is processed or read into memory. Camera resolution can further be classified into standards. For instance, a high definition (HD) standard can be based on a pixel area count of 1,920 by 1080 compared to an ultra-high definition (UHD) standard based on a pixel area count of 4,096 by 2160. Notably the UHD standard is also referred to as 4K-UHD and is four times the HD standard. Additionally, operating a camera for UHD as compared to operating a camera for HD can demand higher read rates when the camera uses a CMOS image sensor.

Shutter operation can be categorized by either a rolling line shutter sequence or a global shutter sequence. During a rolling shutter operation in a CMOS image sensor, the rows of a pixel array can be exposed and read sequentially; thus, there is delay between consecutive rows. The delay can, in turn, lead to picture distortion when the rate of the rolling shutter exposure and/or capture sequence is lower than the rate of the moving object. Global shutter can alleviate the distortion problem by exposing and storing all pixel data concurrently (globally). However, due to the way in which exposed pixels must be read row-by-row from a CMOS pixel array, successfully implementing global shutter with high signal to noise ratios can place a high demand on overall system bandwidth.

Due to the technical tradeoffs between system bandwidth and capturing moving images, a camera, video apparatus, and camera system is disclosed that offers all features of UHD, HD, rolling shutter, and global shutter with the functionality to convert from one resolution to another. Thus, as will be described in detail below, an apparatus and method for dynamic pixel management (DPM) of a cross pixel interconnected CMOS image sensor are disclosed. In the exemplary aspects, the cross pixel interconnected CMOS image sensor can be used as described above in FIGS. 2-6, to provide a camera system that provides an advanced DPM scheme for combining HD, UHD, rolling shutter, and global shutter.

Figure 9:
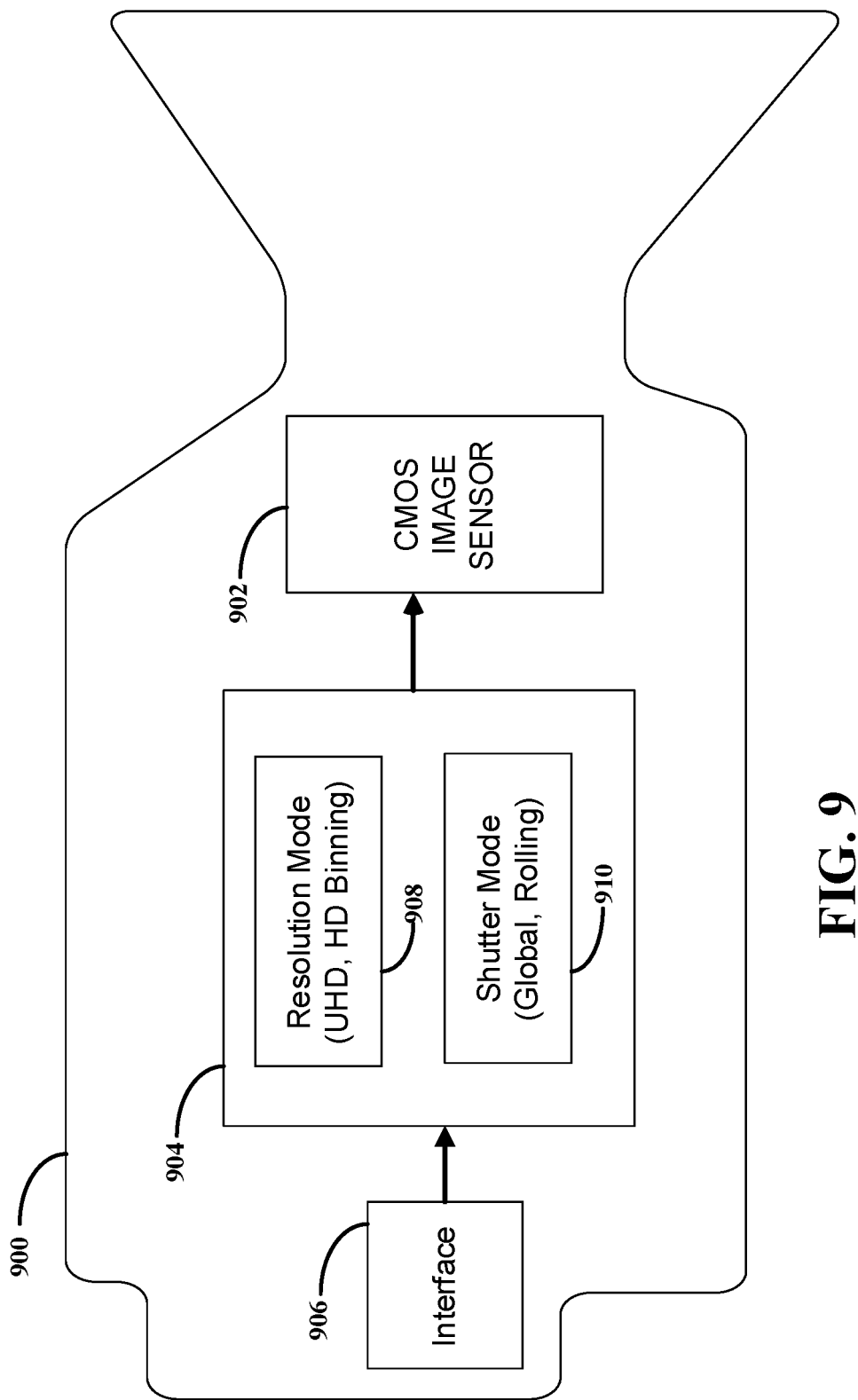
FIG. 9 illustrates a camera system diagram for dynamic pixel management of a CMOS image sensor according to an embodiment.

FIG. 9 illustrates a camera system diagram 900 for dynamic pixel management of a CMOS image sensor 902 according to an embodiment. The camera system diagram 900 includes an interface 906, a dynamic pixel management (DPM) module 904, and the CMOS image sensor 902. The DPM module 904 includes a resolution sub-block 908 and a shutter mode sub-block 910. A user can select a camera feature and/or option via the interface 906. The interface 906 can allow the user to enter a feature selection via an external control panel or via an integrated camera menu. Based on information provided by the user, the DPM module 904 and the sub-blocks 908, 910 can control the CMOS image sensor 902 to transfer and read pixels according to an HD or UHD resolution mode and according to a rolling shutter or global shutter exposure sequence. Effectively, the interface 906 and/or dynamic pixel manager 904, can collectively operate as a camera mode controller configured to switch the camera between a selected UHD mode and a HD mode based on a selected image resolution for an image capture. In turn, as will be described in detail below, the image sensor individually samples sub-pixels of each pixel in an image sensor when the camera mode controller sets the camera to the UHD mode for the image capture and collectively samples the sub-pixels of each pixel in the image sensor when the camera mode controller sets the camera to the HD mode for the image capture.

The camera user can additionally choose a video format based, at least in part, on active lines and video modes. An exemplary camera using DPM can include selections for a plurality of video formats including 1080P50, 1080P59, 1080P150, 1080P179, 1080i300, 1080i359, 4K50, and 4K50. Here 1080, 4K, "P", and "i" can represent HD pixels (1080), 4K-UHD pixels (4096), "Progressive", and "interlaced," while the numbers including 50, 59 can relate to framerates.

Figure 10:
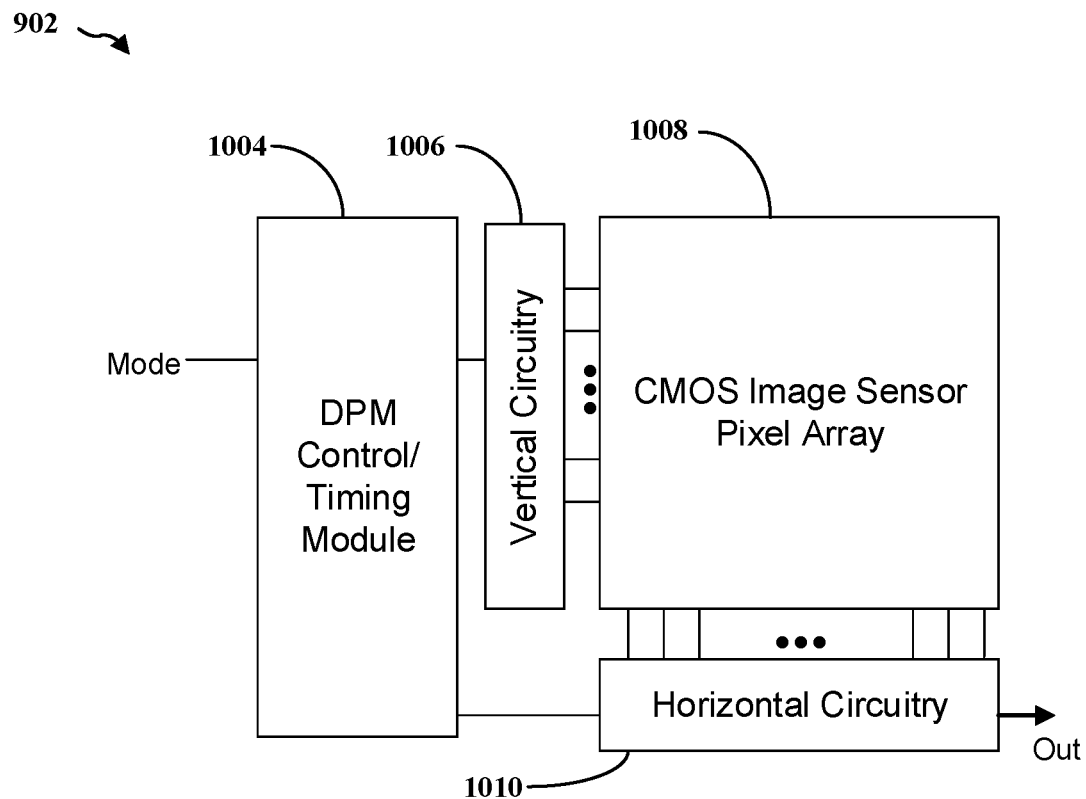
FIG. 10 illustrates a system architecture of a CMOS image sensor according to an embodiment.

FIG. 10 illustrates a system architecture of a CMOS image sensor 902 according to an embodiment. The CMOS image sensor 902 includes a dynamic pixel manager or DPM module 1004, vertical circuitry 1006, a CMOS image sensor array 1008, and horizontal circuitry. The CMOS image sensor array 1008 can be a cross pixel interconnected sensor array as described herein and can also be referred to as a shared pixel sensor array. The DPM module 1004 can receive one or more signals indicating a user selected "Mode". For instance, the user may select a camera feature "Mode" from the plurality video formats 1080P50, 1080P59, 1080P150, 1080P179, 1080i300, 1080i359, 4K50, and/or 4K50, as described above.

The DPM module 1004 can be realized with one or more elements within the CMOS image sensor to control sub-pixels of the CMOS image sensor array 1008. For instance, when the user selects 4K50, the DPM module 1004 can determine the operation mode (i.e., HD vs. UHD as selected for the preferred resolution of the captured image, for example) provide control signals to the vertical circuitry 1006 and to the horizontal circuitry 1010 so that sub-pixels of the CMOS image sensor array 1008 (photodiodes) are read sequentially and in a rolling shutter mode. Alternatively, if a video format indicating an HD "Mode" is selected, then the DPM module 1004 can provide signals to the vertical circuitry 1006 and to the horizontal circuitry 1010 so that sub-pixels of the CMOS image sensor array 1008 (photodiodes) are binned together and read in either a rolling shutter or horizontal shutter mode.

According to the exemplary aspect, the dynamic pixel manager can implement a number of controllers, include a UHD mode controller and a HD mode controller that are configured to perform the pixel (sub-pixel or photodiode) sampling as described herein. For example, the UHD mode controller can be configured to control the plurality of vertical and horizontal charge circuitry to sequentially transfer charge between the at least two photodiodes and the shared floating diffusion of each shared pixel unit when the dynamic pixel manager sets the operational mode of the CMOS image sensor to the UHD mode to individually sample output values of each of the at least two photodiode during the image capture by the image sensor. Moreover, the HD mode controller configured to control the plurality of vertical and horizontal charge circuitry to bin charge concurrently between the at least two photodiodes and the shared floating diffusion of each shared pixel unit when the dynamic pixel manager sets the operational mode of the CMOS image sensor to the HD mode to collectively sample output values of each shared pixel unit that combines output values of the at least two photodiodes during the image capture by the image sensor. In one exemplary aspect, these controllers can be implemented as part of control unit 850 described above.

Although the system architecture of the CMOS image sensor 902 shows an architecture having four system blocks (the DPM module 1004, the vertical circuitry 1006, the horizontal circuitry 1010, the CMOS image sensor array 1008), other configurations are possible. As one of ordinary skill in the art can appreciate, the vertical circuitry 1006 can comprise circuit blocks for controlling rows of the CMOS image sensor array 1008 and the horizontal circuitry 1010 can comprise circuit blocks for reading and processing columns of the CMOS image sensor array 1008. For instance, vertical and horizontal circuitry 1006, 1010 can include shift registers. Also, horizontal circuitry 1010 can include noise cancellation circuitry for use with digital double sampling and can also include analog to digital (A/D) converters, digital signal processors (DSPs), memory, and the like. The horizontal circuitry can provide output data "OUT" in a format suitable for reading in digital and analog formats.

The DPM module 1004 can include timing circuit blocks including but not limited to phase locked loops (PLLs) and serial/parallel interface components. In other configurations timing circuit blocks including PLLs can be external to the DPM module 1004. As one of ordinary skill in the art can appreciate, DPM functionality, as represented by the DPM module 1004, can be implemented with both software and hardware and can be realized with one or more circuit components including microprocessors and/or controllers.

Figure 11A:
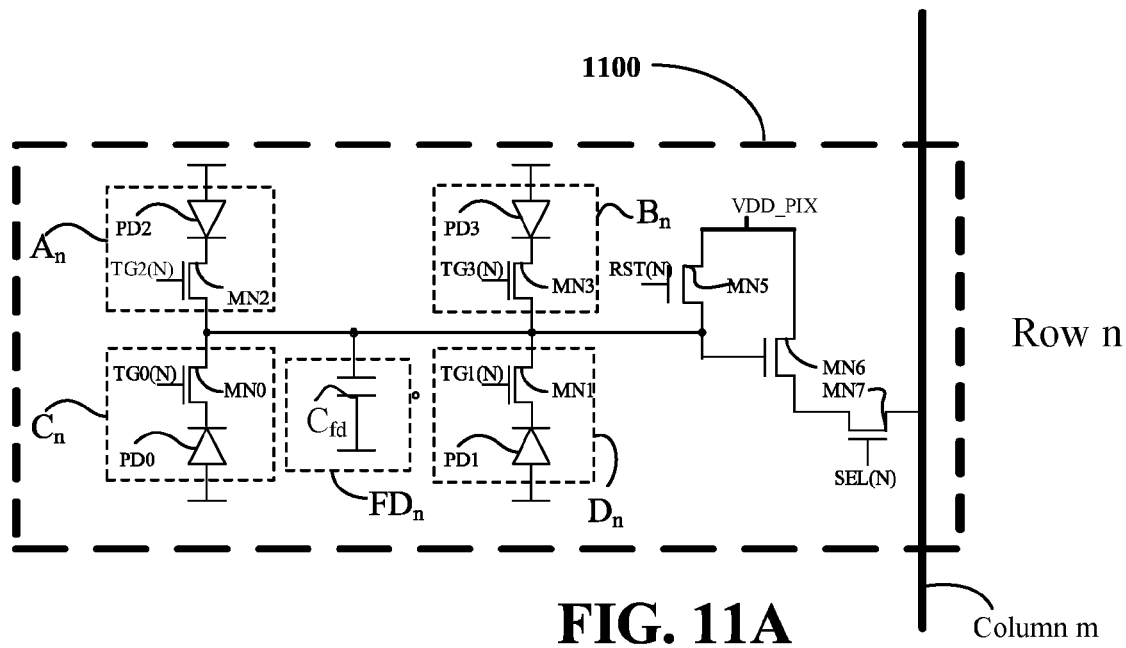
FIG. 11A illustrates a schematic diagram of a shared pixel unit according to an embodiment.

FIG. 11A illustrates a schematic diagram of a shared pixel unit 1100 according to an embodiment. A 4T shared pixel sensor can also be referred to as a shared pixel unit 1100; and the shared pixel unit 1100 can be equivalent to the exemplary 4T shared pixel CMOS image sensor of FIG. 2. However, the components and signal inputs have been arranged to facilitate discussion of timing diagrams. The shared pixel unit 1100 includes sub-pixels An, Bn, Cn, and Dn, each electrically coupled between ground and a storage node of floating diffusion $FD_n$ for an N-th row (n-th row) within a shared pixel array. As shown in FIG. 11A, the floating diffusion FDn is modeled as a capacitor $C_{fd}$. Also, the storage node is electrically coupled to a source of reset transistor MN5 and to a gate of source follower transistor MN6. The select transistor MN7 is coupled between the source of transistor MN6 and the column buss "COLUMN".

The sub-pixels An, Bn, Cn, and Dn, are shared pixel units and each includes a photodiode (PD0-PD3) and a gate transistor (MN0-MN3). As discussed above with respect to FIG. 2 and as shown in FIG. 11A, the gate nodes (gates) of transistors (MN0-MN3) each receive a transfer gate signal TG0(N)-TG3(N). Also, the gate of reset transistor MN5 receives a reset signal RST(N) and the gate of the read select transistor MN7 receives a select signal SEL(N). The index "N" indicates the signals are applied to the gates of the pixel array unit of row N (row n). As detailed in FIG. 11B, each sub-pixel An, Bn, Cn, and Dn, can be realized by a composite layout of a gate between the floating diffusion FDn and a diffusion of a photodiode (PD0-PD3).

Figure 11B:
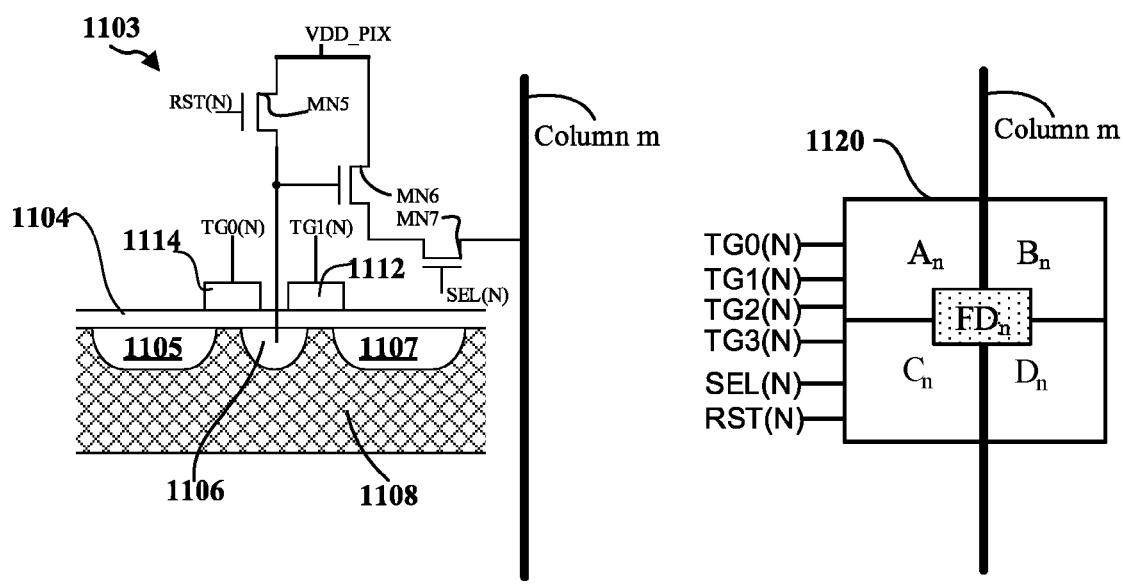
FIG. 11B illustrates a partial cross-sectional device diagram of a shared pixel unit according to the embodiment of FIG. 11A.

FIG. 11B illustrates a partial cross-sectional device diagram 1103 of a shared pixel unit according to the embodiment of FIG. 11A. The partial cross-sectional device diagram 1103 shows includes a simplified cross section representation of diffusions 1105, 1106, 1107 and interconnect relating to sub-pixels Cn, Dn and floating diffusion FDn. In FIG. 11B the diffusions 1105 and 1107 can represent N-type diffusions of photodiodes PD0 and PD1, respectively forming junctions in P-epitaxial layer 1108; and diffusion 1106 can represent the N-type diffusion forming a storage depletion layer capacitor $C_{fd}$ in floating diffusion FDn. As shown in FIG. 11B, transistor MN0 can be formed by the gate 1114 between diffusions 1105 and 1106, and transistor MN1 can be formed by the gate 1112 between diffusions 1107 and 1106.

As one of ordinary skill in the art can appreciate, when the gate TG0(N) receives a signal or voltage causing an inversion region between diffusions 1105 and 1106, charge can be transferred between the diffusions 1105 and 1106. Similarly, when the gate 1114 receives a signal or voltage TG1(N) causing an inversion region between diffusions 1107 and 1106, charge can transferred between the diffusions 1107 and 1106. Referring to FIG. 11A, it can be said that charge is transferred between photodiode PD0,1 and the floating diffusion FDn when the transfer gates exert a logic "high".

Figure 11C:
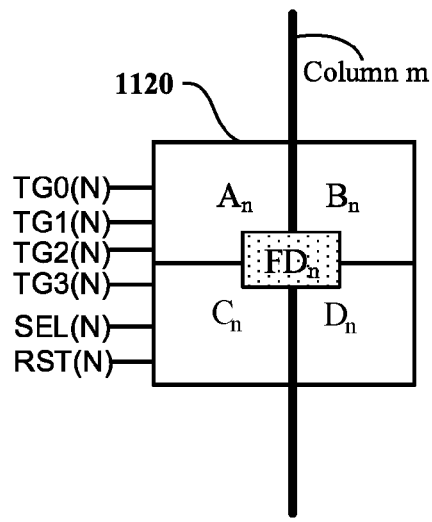
FIG. 11C illustrates a symbol diagram of the shared pixel unit according to the embodiment of FIG. 11A.

FIG. 11C illustrates a symbol diagram 1120 of the shared pixel unit according to the embodiment of FIG. 11A. The symbol diagram 1120 shows a hierarchical schematic symbol representation of the schematic of FIG. 11A. As one of ordinary skill in the art can appreciate, the symbol diagram can be a convenient way to show the sub-pixels and their connection with the gating signals TG0(N)-TG3(N), the row select signal SEL(N), and the row reset signal RST(N).

Figure 12:
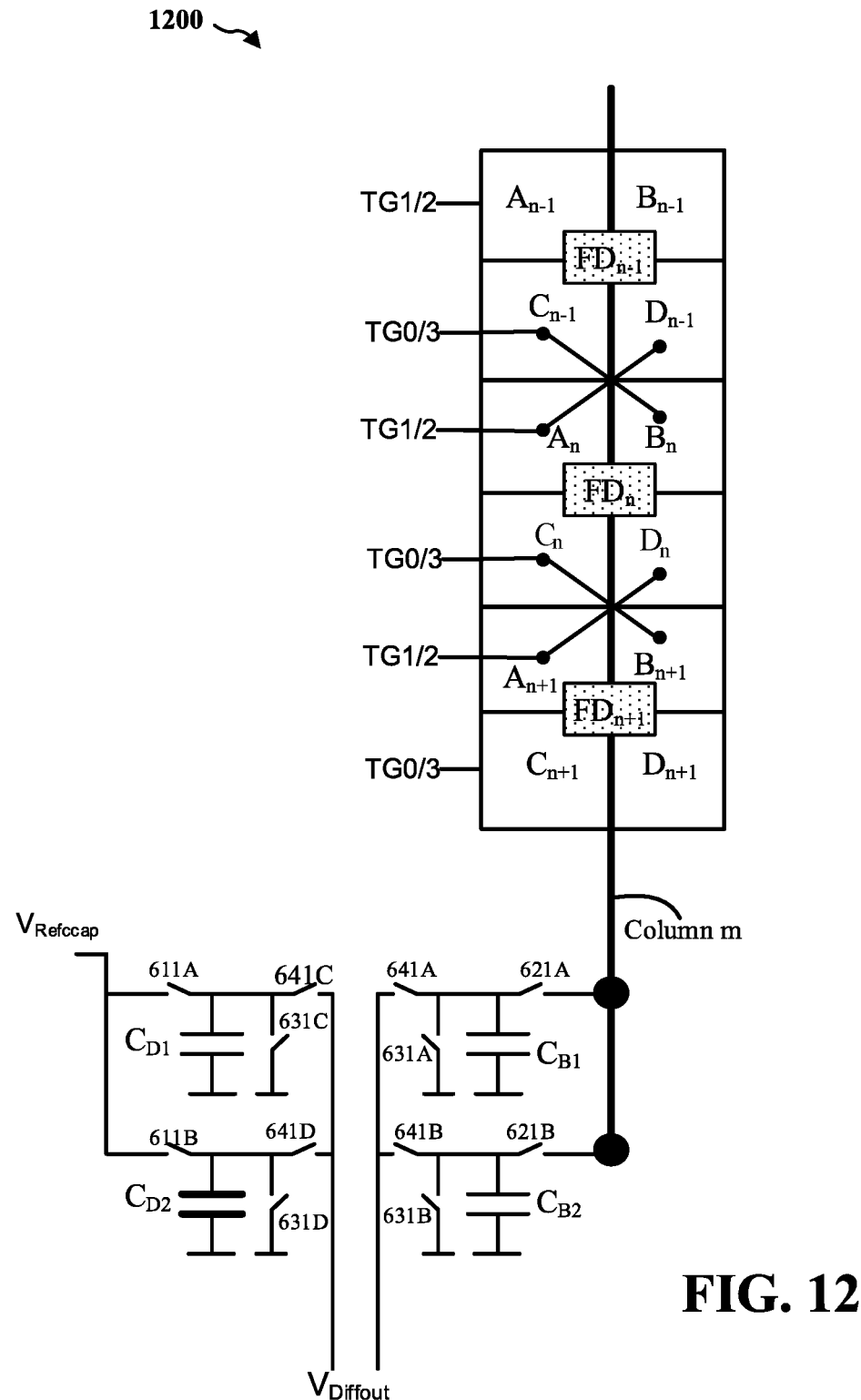
FIG. 12 illustrates features of a column circuit with shared pixel units according to an embodiment.

FIG. 12 illustrates features of a column circuit 1200 with shared pixel units according to an embodiment. The column circuit 1200 of FIG. 12 can be equivalent to the conceptual view of the pixel array portion of FIG. 4, except further details of the signals have been included to facilitate discussion of the timing diagrams; also, FIG. 4 introduces noise cancellation circuitry. The column circuit 1200 of FIG. 12 shows three pixel array units for rows N−1, N, and N+1, (also referred to in the lower-case as rows n−1, n, and n+1). The row N−1 pixel array unit includes sub-pixels $A_{n-1}$, $B_{n-1}$, $C_{n-1}$, and $D_{n-1}$. The row N pixel array unit includes sub-pixels $A_n$, $B_n$, $C_n$, and Dn; and the row N+1 pixel array unit includes sub-pixels $A_{n+1}$, $B_{n+1}$, $C_{n+1}$, and $D_{n+1}$.

Similar to the column circuit of FIG. 4, the pixel array units for the N−1, N, and N+1 rows have a crisscross interconnect pattern advantageously allowing gate signals to be combined. As shown in FIG. 12, the transfer gate signals have been combined. For instance, the sub-pixel $A_{n+1}$ and the sub-pixel $D_n$ are shown to receive a signal TG1/2 (combining TG1(N+1) with TG2(N)), and the sub-pixel $B_{n+1}$ and the sub-pixel $C_n$ are shown to receive a signal TG0/3 (combining TG0(N) with TG3(N+1)). As can be understood from the timing diagrams, a subscript for the rows has been dropped in the labelling. For instance, as will be explained with respect to the timing diagrams, the signal TG1/2 corresponding to sub-pixels $A_{n+1}$ and $D_n$ can be sequenced independently of the signal TG1/2 corresponding to sub-pixels $A_n$ and $D_{n-n}$. Similarly, the signal TG0/3 corresponding to sub-pixels $B_{n+1}$ and $C_n$ can be sequenced independently of the signal TG0/3 corresponding to sub-pixels $B_n$ and $C_{n-1}$.

FIG. 12 also shows a switched capacitor approach for providing differential digital double sampling (dDDS) and digital double sampling (DDS). As shown, the circuit includes four capacitors CD1, CD2, CB1 and CB2 that are provided to store the video level and the dark level for the digital double sampling. In particular, two "bright" capacitors (i.e., capacitors CB1 and CB2) are provided to sample the video level and two "dark" capacitors (i.e., capacitors CD1 and CD2) are provided to sample the reference level. Thus, as shown, capacitors CD1 and CD2 are coupled to a capacitor reference voltage to readout a fixed value from the reference voltage while capacitors CB1 and CB2 are coupled to the bitline (column m) of the pixel array to sample the pixel voltages of the dark, bright and double bright values of each pixel output (i.e., the video level). The readout path is fully differential and the connection of each capacitor depends on the mode of operation as will be described in detail below.

At the end of column line (column m), there are two switches, 621A and 621B for selectively connecting the output of the pixel array to storage capacitors CB1 and CB2 to sample the dark, bright and double bright values, respectively, from the pixel array. Moreover, the readout circuit includes are two more switches, 611A and 611B for selectively connecting the storage capacitors CD1 and CD2 to a reference voltage for the capacitors. Each of the capacitors CB1, CB2, CD1 and CD2 is respectively connected in parallel to a reset switch 631A, 631B, 631C and 631D, in order to reset the capacitors to a previous value to GND (ground). Moreover, column selection switches 641A-641D are respectively provided between the storage capacitors and a bus bar (not shown) that ultimately outputs the measured differential voltages to an A/D converter (also not shown) and then to a buffer. Thus, the column selection switches 641A-641D are controlled to output stored signals from storage capacitors CD1, CD2, CB1 and CB2 to one of the columns at a time to the bus bar. Each of the pixels is activated at a given time by a row decoder.

Advantageously, using this design, the sampling of the pixel output voltage from the pixel array is decoupled from the A/D conversion. The decoupling enables high speed readout of the pixel output voltages by putting these two actions in parallel instead of serial operation.

Figure 13A:
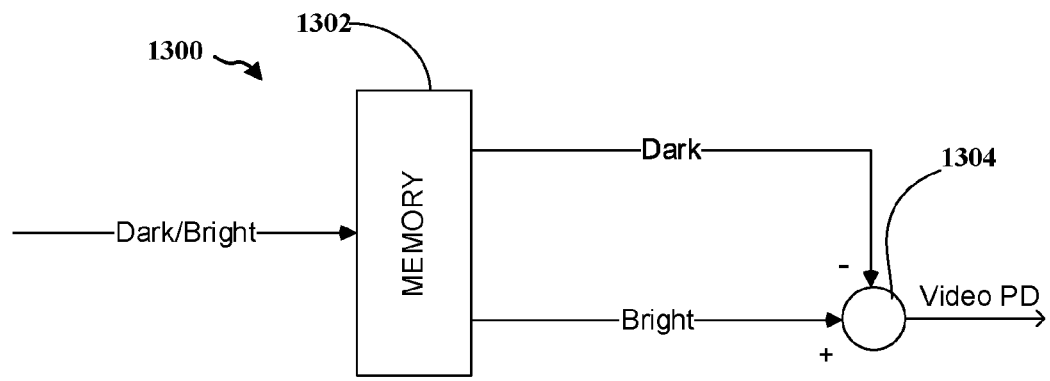
FIG. 13A illustrates a control diagram for subtracting noise according to an embodiment.

FIG. 13A illustrates a control diagram 1300 for subtracting noise according to an embodiment. The control diagram 1300 includes memory 1302 and a summing block 1304 for using a DDS scheme. The memory 1302 receives a digital representation of a dark (DARK) and/or a bright (BRIGHT) signal. The dark signal can be a digital symbol representation of column data read following a reset of a pixel and prior to exposure of a sub-pixel photodiode. A bright signal can represent a digital symbol representation of column data read following the exposure and transfer of charge between a photodiode and floating diffusion within a shared pixel unit. After a floating diffusion is reset, a value (DARK) is sampled on a column, such as column m of FIG. 11A, and stored on a column capacitor. An analog to digital converter can convert the signal and the digital symbol can then be stored into the memory 1302. After a transfer pulse (TG) such as TG0/3 or TG1/2 is exerted, a bright signal from the floating diffusion is again read out (BRIGHT) and the two values are subtracted at the summing block 1304 to provide a reduced noise video signal (Video PD). This can advantageously remove noise and additional components of random and systematic offset inherent in electronic systems. The control diagram 1300 can be implemented in a DSP and/or controller using digital symbols from A/D conversion of analog pixel data. The pixel data can be pixel data read from the columns such as column m of FIG. 12.

Figure 13B:
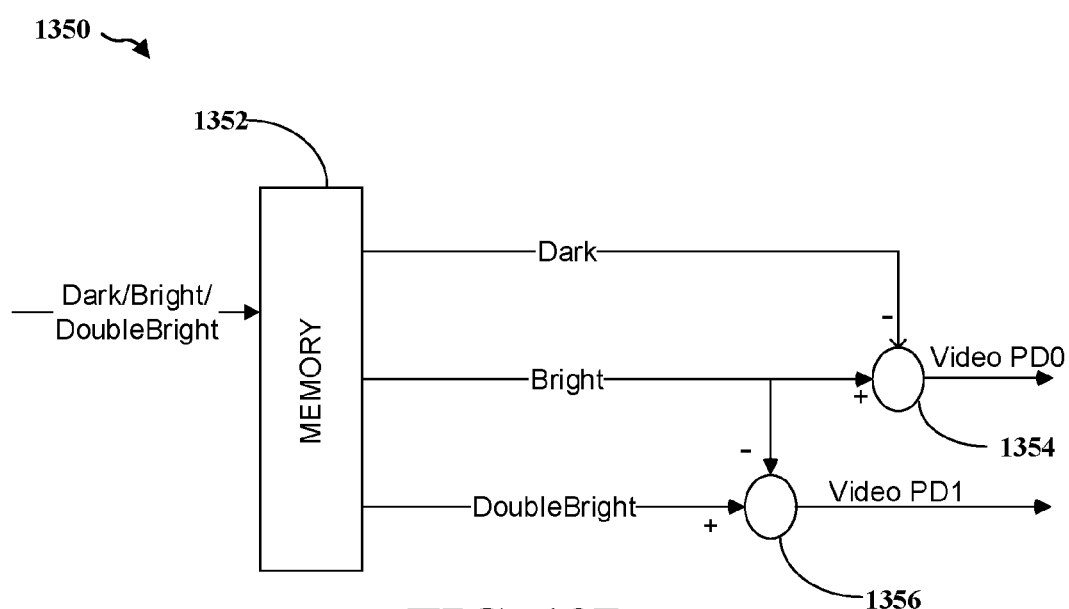
FIG. 13B illustrates a control diagram for subtracting noise according to another embodiment.

FIG. 13B illustrates a control diagram 1350 for subtracting noise according to another embodiment. The embodiment of FIG. 13B is similar to that of FIG. 13A except the control diagram 1350 includes an additional summing junction to implement differential DDS. The control diagram 1350 includes memory 1352, a summing block 1354, and a summing block 1356 to implement a differential DDS (dDDS) scheme. The memory 1352 is shown to receive a digital representation of a dark (DARK), bright (BRIGHT), and double bright (DOUBLEBRIGHT) signal. A bright signal can represent a digital symbol representation of column data read following the exposure and transfer of charge between a photodiode and floating diffusion within a shared pixel unit. After a floating diffusion is reset, a value (DARK) is sampled on a column, such as column m of FIG. 11A, and stored on a column capacitor. An analog to digital converter can convert the signal which is then stored into the memory 1352.

After a transfer pulse (TG) such as TG0/3 or TG1/2 is exerted, a bright signal from the floating diffusion is again read out (BRIGHT) and the two values are subtracted at the summing block 1354 to provide a reduced noise video signal (Video PD0). Following the read of the bright signal, another read operation can be performed to read out another sub-pixel superimposed upon the previous bright (BRIGHT) signal to provide a double bright (DOUBLEBRIGHT) signal. The bright signal can then be subtracted from the double bright signal in summing block 1356 to provide a second reduced noise video signal (Video PD1). This advantageously provides two reduced noise signals; and the timing sequence for differential DDS (dDDS) can advantageously reduce the output raw data rate. Instead of requiring twice the data-rate as compared to an analog double sampling readout scheme, the dDDS scheme can reduce the output raw data rate by using the Dark, Bright and Double Bright values to reconstruct two pixels Video PD0 and Video PD1 with reset-noise suppression each.

Figure 14A:
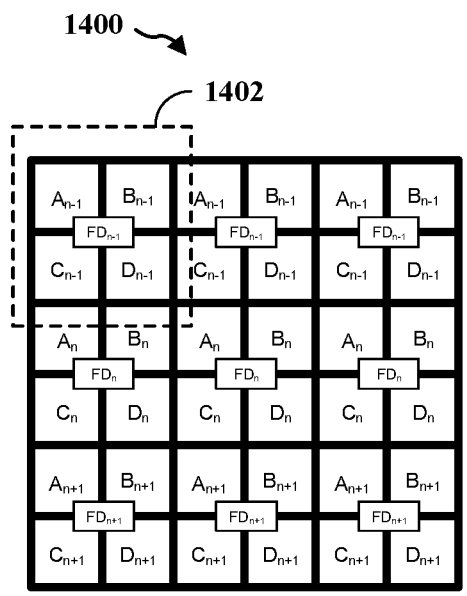
FIGS. 14A-B illustrate a comparison of a pixel array using an ultra-high definition (UHD) resolution mode with a pixel array using a high definition (HD) resolution mode according to dynamic pixel management (DPM) embodiments.
Figure 14B:
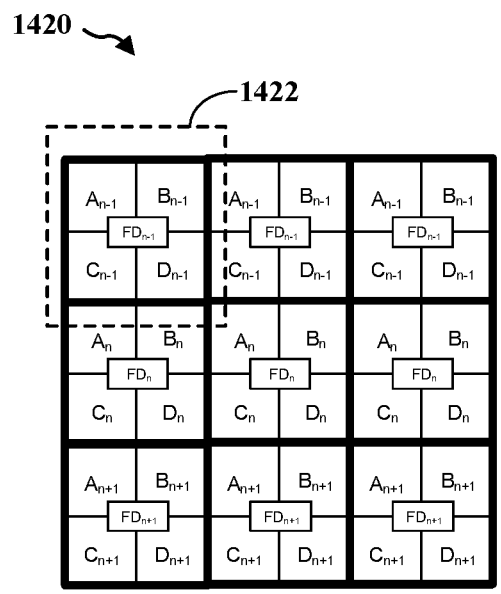

FIGS. 14A-B illustrate a comparison of a pixel array 1400 using an ultra-high definition (UHD) resolution mode with a pixel array 1420 using a high definition (HD) resolution mode according to dynamic pixel management (DPM) embodiments. As illustrated by the pixel array unit 1402, in UHD mode the sub-pixels $A_{n-1}$, $B_{n-1}$, $C_{n-1}$ and $D_{n-1}$ can be transferred to their floating diffusion point $FD_{n-1}$ for individual readout along a column bit-line (column). As depicted, this allows a four times higher spatial resolution compared to the HD readout mode of pixel array 1420. In UHD mode readout can be either use DDS or dDDS.

Pixel array 1420 depicts pixel binning. As illustrated by the pixel array unit 1422, in HD mode the sub-pixels $A_{n-1}$, $B_{n-1}$, $C_{n-1}$ and $D_{n-1}$ can be transferred (binned) to their floating diffusion point $FD_{n-1}$ concurrently for a combined sub-pixel readout along a column bit-line (column). The sub-pixels are binned in parallel to create a larger pixel having effectively four times the area of a sub-pixel. This can advantageously provide for a better pixel with more exposure surface area at the expense of lower overall pixel resolution. In pixel binning, four photo diodes are readout at once. Charge from four photo diodes is are binned (collected) at the floating diffusion node $FD_{n-1}$.

Charge domain binning can increase sensitivity proportional to the number of pixels binned. In the pixel array 1420 configured for HD readout, the pixel read noise can be the same as the read noise in the pixel array 1400. Thus, there can be an increase in performance by a factor of four. In addition the read-out speed can also increase by a factor of four, since one instead of four pixels are read. Advantageously, in HD mode both global shutter and rolling shutter sequencing can be implemented.

Figure 15A:
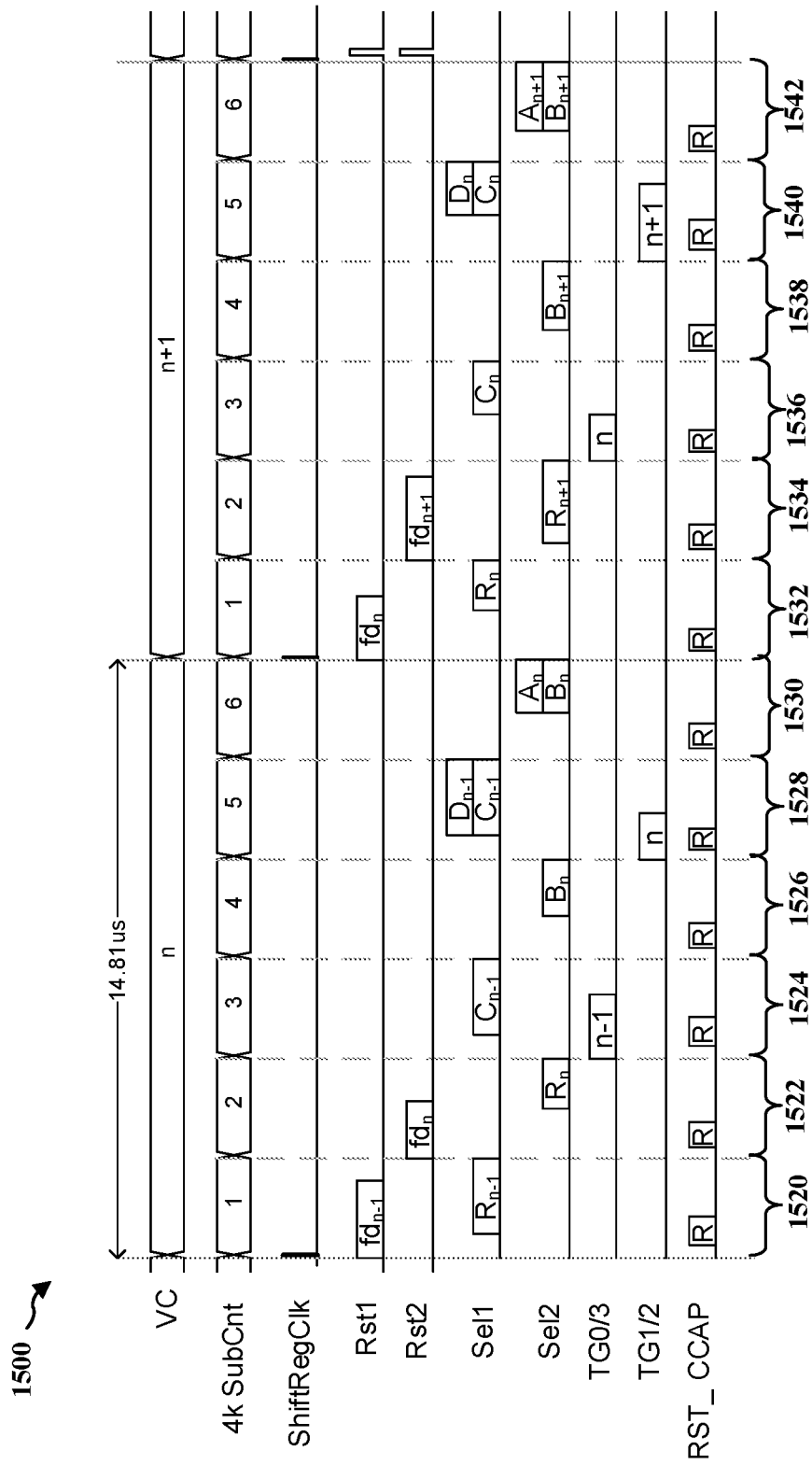
FIG. 15A illustrates a pixel timing readout scheme of signals corresponding to an ultra-high definition (UHD) mode with differential digital double sampling (dDDS) according to an embodiment.
Figure 15B:
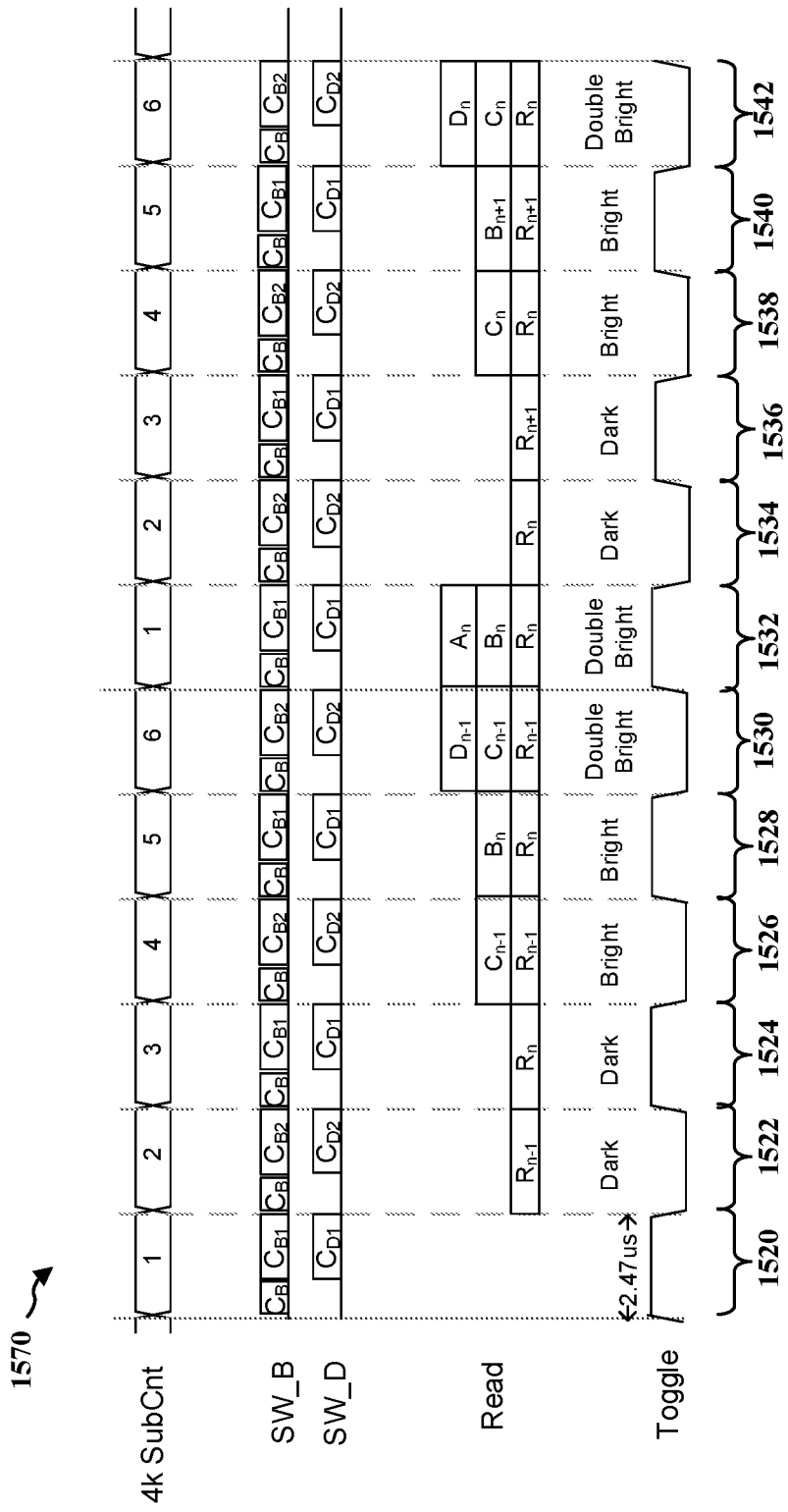
FIG. 15B illustrates a pixel timing readout scheme of additional signals corresponding to the embodiment of FIG. 15A.

FIG. 15A illustrates a pixel timing readout scheme 1500 of signals corresponding to an ultra-high definition (UHD) mode with differential digital double sampling (dDDS) according to an embodiment. FIG. 15B illustrates the pixel timing readout scheme 1570 of additional signals corresponding to the embodiment of FIG. 15A.

The readout schemes 1500, 1570 can illustrate horizontal timing of a pixel array having a crisscross interconnect pattern for providing differential digital double sampling. As shown, the horizontal readout schemes 1500, 1570 can be based on a counter to provide cycles of six sub-counts as indicated by signal "4K SubCnt". The timing diagram time axis is therefore shown to be partitioned into counter based cycles labelled 1520-1542. In this regard, the counter performs the count operation in synchronization with clocks having a fixed period; for instance, a shift register clock signal "ShiftRegClk" is shown to provide a clock pulse every six cycles. Also, in regard to the counter based cycles, during each cycle 1520-1542 a column capacitor is reset via the signal "RST_CCAP".

In one embodiment, the readout can performed in accordance with the 1080p standard with each readout (i.e., each clock cycle) being performed at 14.81 µs as indicated by the VC signal index. After each readout cycle, there can be six values that are obtained, two dark values, two bright values, and two double bright values. After the differential digital double sampling technique is applied using these values, corrected digital outputs of four pixels can be obtained, which generates a 4k/UHD standard.

For purposes of illustration, the timing diagram is annotated in accordance with the sub-pixels illustrated in FIG. 12 discussed above. As shown, during a first count value 1520, a reset signal Rst1 can be applied to a row n−1, and more particularly, to reset a floating diffusion $fd_{n-1}$ ($FD_{n-1}$). Preferably, the reset signals have a width of 22 clocks at 222 MHz or 99 nanoseconds. During this same count, a select signal Sel1 is applied to row n−1, i.e., $D_{n-1}$. Preferably, the select signals have a width of 210 elks at 222 MHz or 943 nanoseconds. Similarly, during a second count value 1522, a reset signal Rst2 is applied to row n, i.e., to floating diffusion point $fd_n$ ($FD_n$) and a select signal Sel2 is applied to row n, i.e., to $D_n$. Thus, it should be appreciated that in accordance with the dDDS filtering technique, each of rows n−1 and n have been reset such that digital data for each pixel can obtained. This is shown in the readout row (i.e., "READ") in which the dark values $R_{n-1}$ and $R_n$ are read out from the pixel array during counts 2 and 3 of the clock cycle.

In general, the timing diagram illustrates that the capacitors are reset by RST_CCAP value at the top of each count and the control signal SW_B for capacitors CB1 and CB2 and the control signal SW_D for capacitors CD1 and CD2 are continuously applied to sample the date on the bitline (column) as should be understood to those skilled in the art. The resetting and sampling of these capacitors will not be described for each separate count in the cycle.

Once the dark values $R_{n-1}$ and $R_n$ are sampled at counts 1 and 2 (count period 1520 and 1522), and readout at counts 2 and 3 (1522 and 1523), the timing continues to count 3 (1523) of the cycle. As shown, a transfer gate TG0/3 is applied to activate the corresponding sub-pixel in rows n−1 and n. For example, this transfer gate signal TG0/3 can activate sub-pixels $C_{n-1}$ and $B_n$. Thus, when select signal Sel1 is applied again to row n−1, sub-pixel $C_{n-1}$ can be readout as further shown during count 4 (1526). Similarly, when select signal Sel2 is applied again to row n, sub-pixel $B_n$ can be readout as further shown during count 5 (1528). Preferably, the transfer gate signals have a width of 320 clocks at 222 MHz or 1437 nanoseconds.

Furthermore, during count 5 (1528), a transfer gate TG1/2 can be applied to activate the corresponding sub-pixels in row n and n−1. This transfer gate signal TG1/2 can activates sub-pixels $D_{n-1}$ and $A_n$. Thus, when select signal Sel1 is applied again to row n−1, a double bright value of both sub-pixel $C_{n-1}$ and $D_{n-1}$ can be readout as further shown during count 6 (1530). Similarly, when select signal Sel2 is applied again to row n, a double bright value of sub-pixel $B_n$ and sub-pixel $A_n$ can be readout as further shown during count 1 of the next clock cycle (1532). Accordingly, during this counter cycle, the readout circuit has sampled values from sub-pixels $C_{n-1}$ and $B_n$ and double bright values from sub-pixels $C_{n-1}$ and $D_{n-1}$ and from sub-pixels $A_n$ and $B_n$. As described above with respect to FIGS. 13A and 13B, the values for sub-pixels $D_{n-1}$ can be determined by removing the value of $C_{n-1}$ from the double bright value. Similarly, the values for sub-pixels $A_n$ can be determined by removing the value of $B_n$ from the double bright value.

Figure 16A:
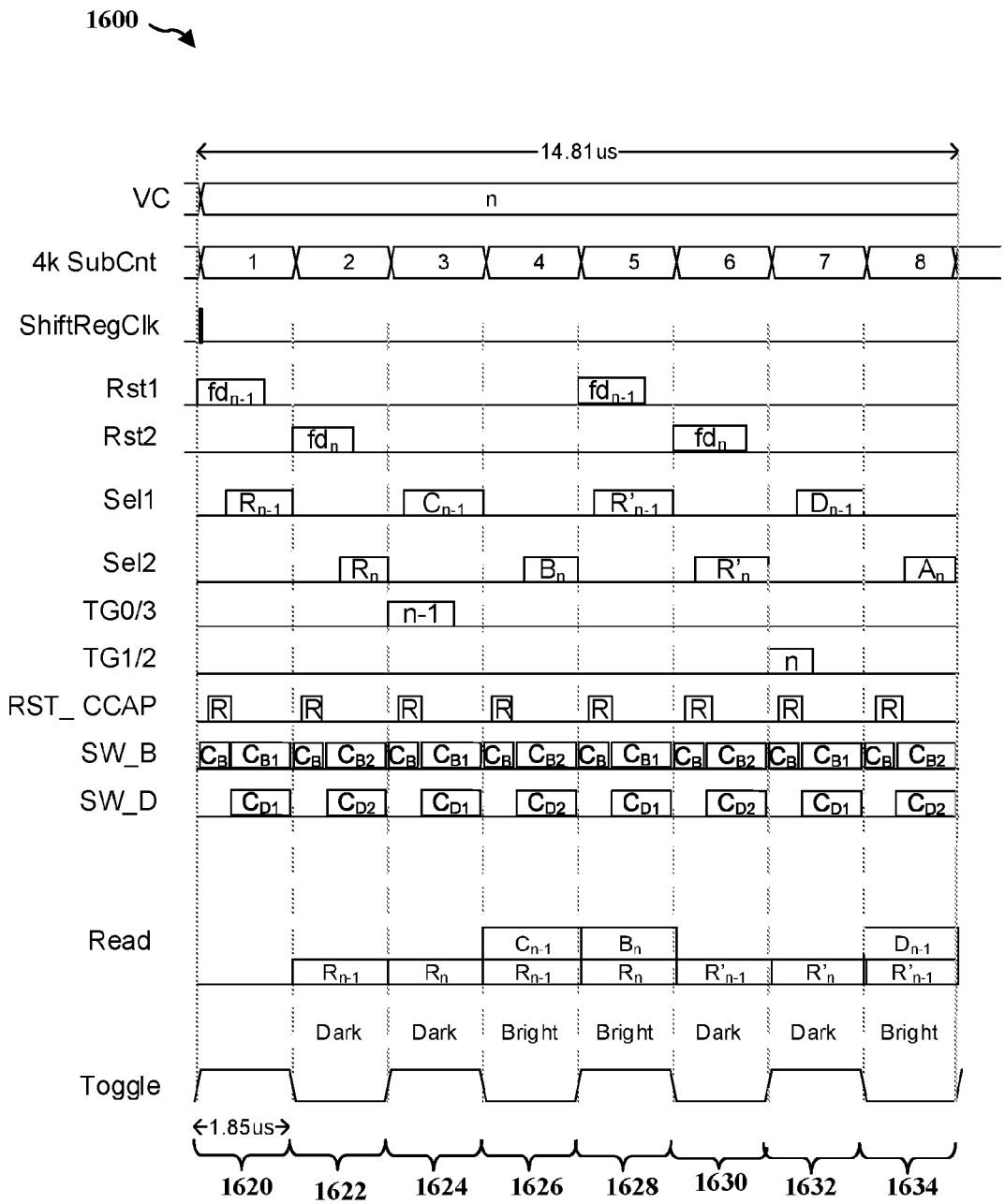
FIG. 16A illustrates a partial pixel timing readout scheme of signals corresponding to an ultra-high definition (UHD) mode with digital double sampling (DDS) according to an embodiment.
Figure 16B:
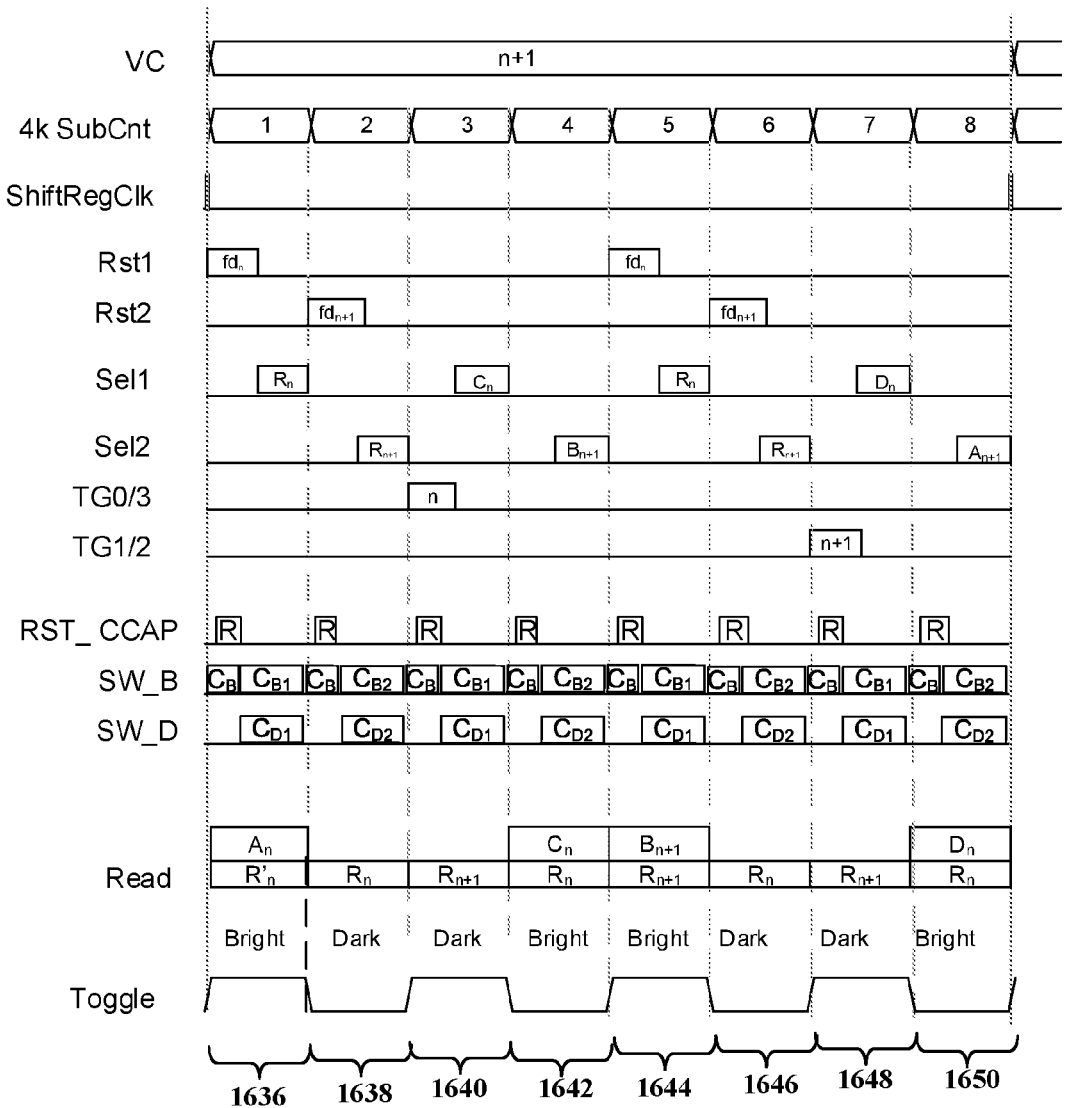
FIG. 16B illustrates a partial pixel timing readout scheme of signals corresponding to the embodiment of FIG. 16A.

FIG. 16A illustrates a partial pixel timing readout scheme 1600 of signals corresponding to an ultra-high definition (UHD) mode with digital double sampling (DDS) according to an embodiment. FIG. 16B illustrates a partial pixel timing readout scheme 1670 of signals corresponding to the embodiment of FIG. 16A. Unlike the readout schemes 1500, 1570, the readout schemes 1600, 1670 show timing diagrams for DDS which is portioned over eight cycles instead of six. The timing diagram time axis, portioned over counter based cycles labelled 16 is therefore shown to be partitioned into counter based cycles labelled 1620-1650. In this regard, the counter performs the count operation in synchronization with clocks having a fixed period; for instance, a shift register clock signal "ShiftRegClk" is shown to provide a clock pulse every eight cycles.

As shown in the readout schemes 1600 and 1670, over a period of eight cycles (1620-1634) of 1.85 us duration, DDS can be implemented in UHD mode. Referring to the "Read" data, the DDS cycles can be implemented so as to read a dark value $R_{n-1}$ during cycle 2 (1622), a dark value $R_n$ during cycle 3 (1624), a bright value $C_{n-1}$ during cycle 4 (1626), and a bright value $B_n$ during cycle 5 (1628). The dark value $R_{n-1}$ can be subtracted from the bright value $C_{n-1}$, and the dark value $R_n$ can be subtracted from the bright value $B_n$ using DDS as depicted in FIG. 13A. As shown, this process of reading in sequence a Dark, Dark, Bright, and Bright signal continues until a total of seven sub-pixel $C_{n-1}$, $B_n$, $D_{n-1}$, $A_n$, $C_n$, $B_{n+1}$, $D_n$ and $B_n$ are read. In this way DDS can be applied each of the seven sub-pixel $C_{n-1}$, $B_n$, $D_{n-1}$, $A_n$, $C_n$, $B_{n+1}$, $D_n$ and $B_n$ values.

Figure 17:
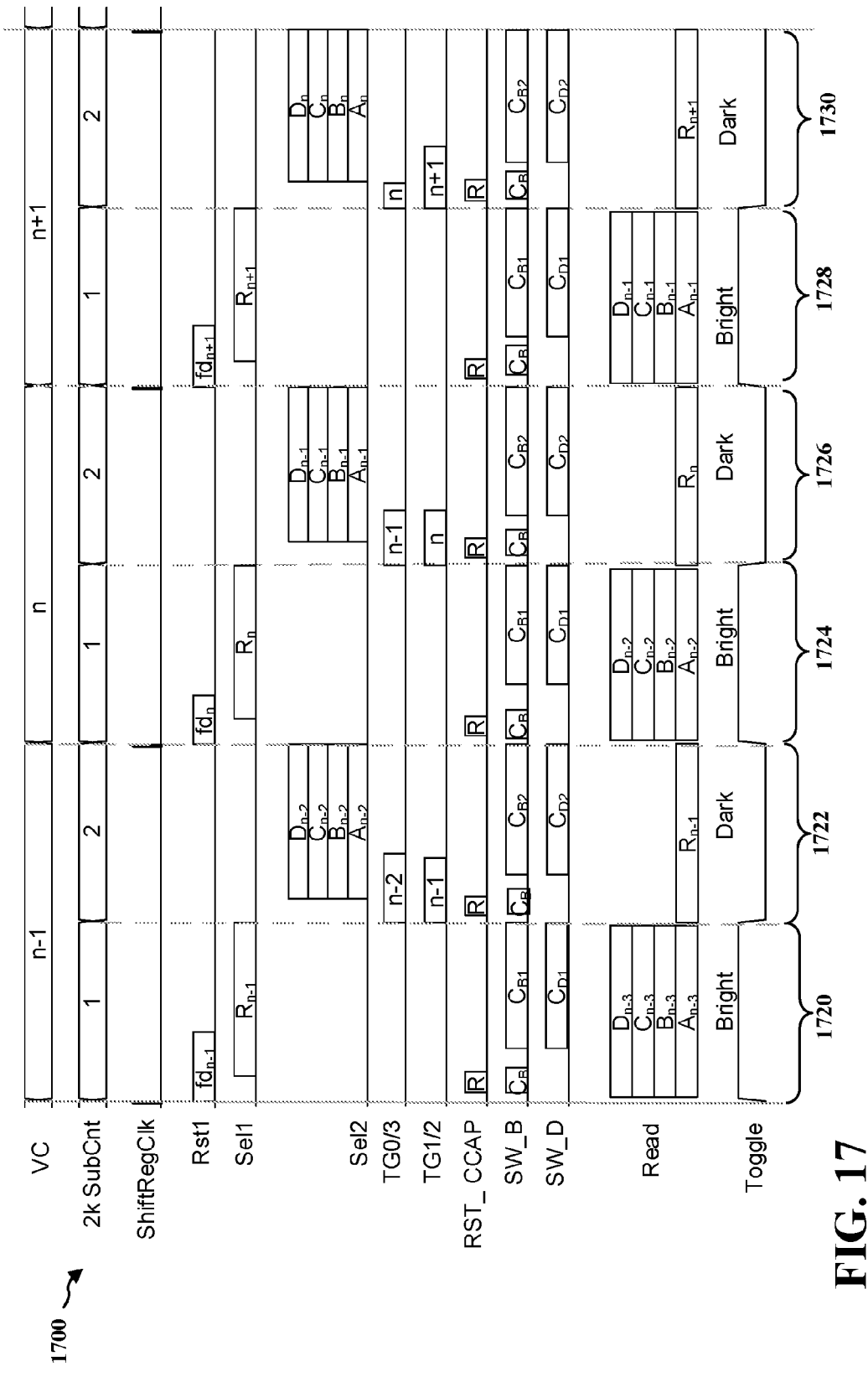
FIG. 17 illustrates a pixel timing readout scheme of signals corresponding to a high definition (HD) mode with digital double sampling DDS according to an embodiment.

FIG. 17 illustrates a pixel timing readout scheme 1700 of signals corresponding to a high definition (HD) mode with digital double sampling DDS according to an embodiment. The pixel timing readout scheme 1700 shows a timing scheme where sub-pixels are binned concurrently and DDS is applied to the read values. As shown the readout scheme 1700 can be accomplished with a counter (2K SubCnt) performing operations over two, instead of six or eight, cycles. In order to accomplish DDS, a total of four cycles may be required. For instance, referring to the "Read" data, the dark signal $R_{n-1}$ for row n−1 can be read during clock period 1722; then all sub-pixels $A_{n-1}$, $B_{n-1}$, $C_{n-1}$, $D_{n-1}$ can be transferred to floating diffusion $FD_{n-1}$ during clock period 1726 and the bright values $A_{n-1}$, $B_{n-1}$, $D_{n-1}$ can be read during clock period 1728. Again DDS can be applied by subtracting the dark values obtained during clock period 1722 from the bright values read during clock period 1728.

Figure 18A:
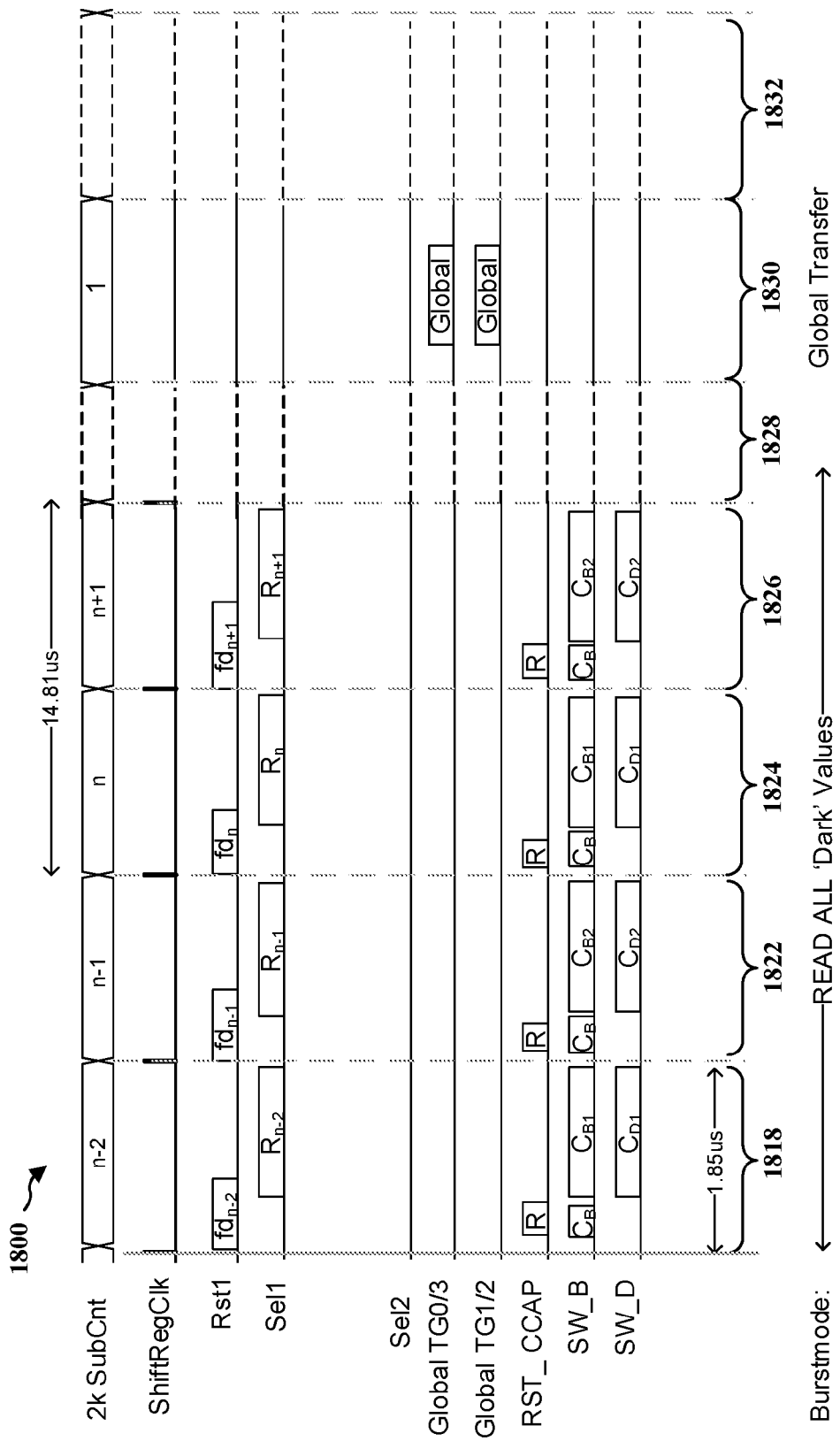
FIG. 18A illustrates a partial pixel timing readout scheme of signals corresponding to an HD mode using a global shutter sequence according to an embodiment.
Figure 18B:
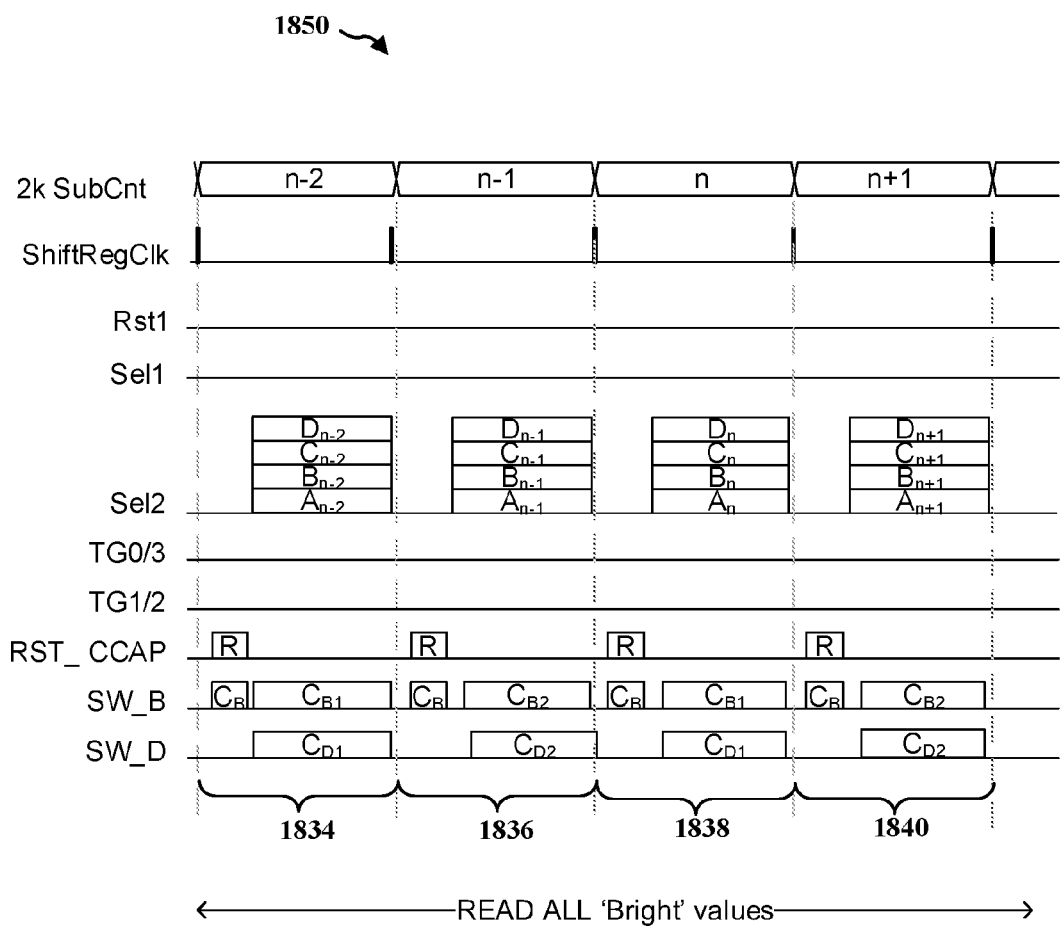
FIG. 18B illustrates a partial pixel timing readout scheme of signals corresponding to the embodiment of FIG. 18A.

FIG. 18A illustrates a partial pixel timing readout scheme 1800 of signals corresponding to an HD mode using a global shutter sequence according to an embodiment; and FIG. 18B illustrates a partial pixel timing readout scheme 1850 of signals corresponding to the embodiment of FIG. 18A. Unlike the timing readout scheme 1700, the readout schemes 1800 and 1850 show timing for global shutter readout.

Again a counter with two cycles (2K SubCnt) is used to partition cycles 1818-1840; however, instead of sequentially reading rows of binned sub-pixels, all dark values are read, and then all bright values are read globally. For instance, during cycles 1818-1826 all dark values are read into memory. Then during cycles 1828-1832 all sub-pixels are binned to transfer charge from each sub-pixel photodiode to its respective, shared floating diffusion. Next, all bright values which were transferred to floating diffusions during cycles 1828-1832, are read during cycles 1834-1840.

Figure 19:
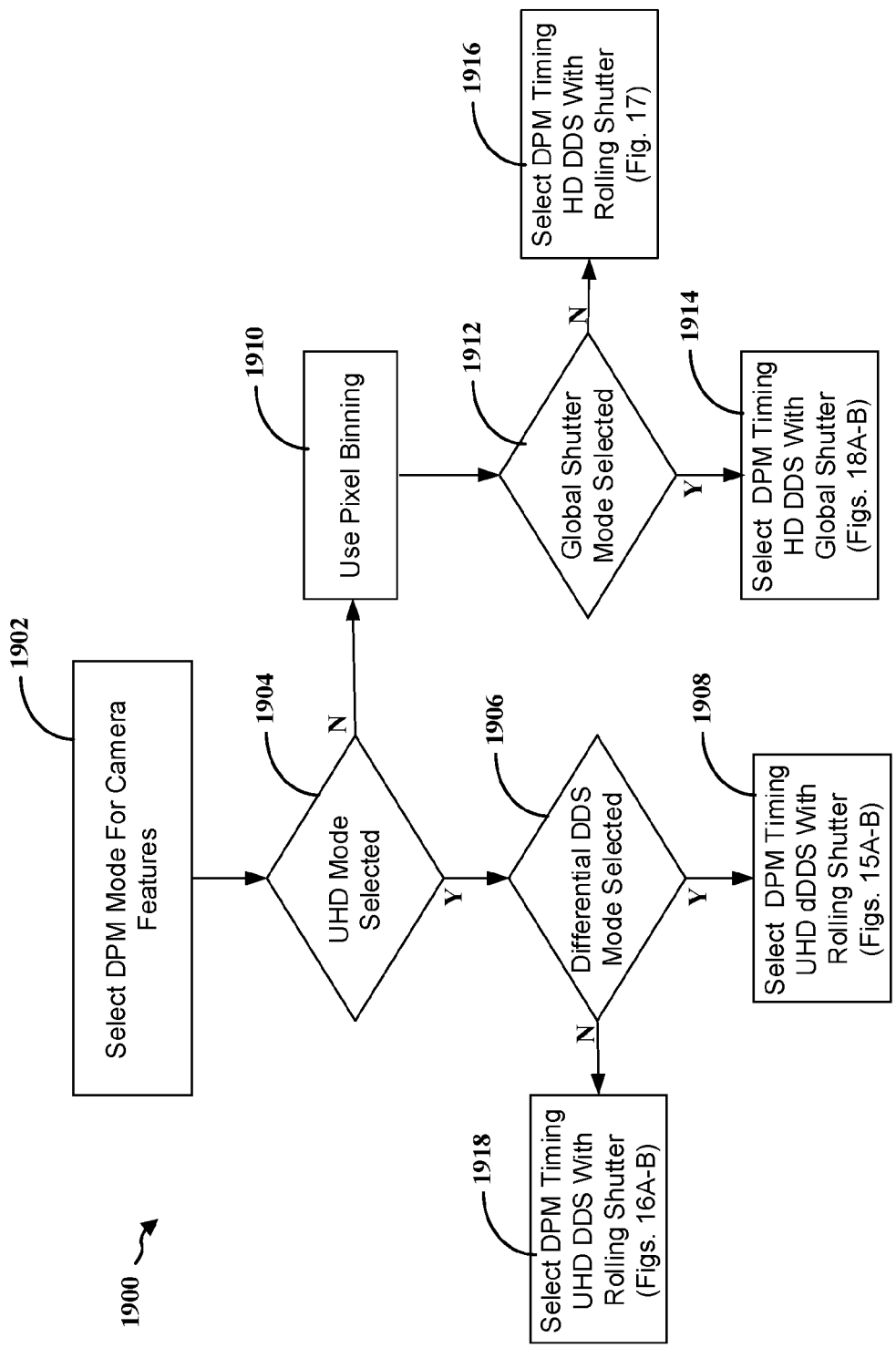
FIG. 19 illustrates a flowchart of dynamic pixel management according to an embodiment.

FIG. 19 illustrates a flowchart 1900 of dynamic pixel management according to an embodiment. The flowchart 1900 includes an initial operation step 1902, decision steps 1904, 1906, 1912, and mode operation steps 1908, 1910, 1914, 1916, 1918. The initial operation step 1902 can include reading the desired camera format from a camera user. This step can include receiving input from a menu or external control panel. Following the initial operation step 1902, a DPM module or another processing element within a camera can perform the decision step 1904.

Decision step 1904 determines if HD or UHD mode has been selected. If HD mode has been selected in decision step 1904, then DPM and/or a DPM module can control the CMOS image sensor to operate in HD mode with pixel binning, as indicated by the operation step 1910. Following step 1910 the decision step 1912 determines if global shutter or rolling shutter is to be used. If global shutter mode has been selected in decision step 1912, then DPM and/or the DPM module can control the CMOS image sensor to read pixels according to global shutter mode and pixel binning with DDS noise reduction. If rolling shutter mode has been selected in decision step 1912, then DPM and/or a DPM module can control the CMOS image sensor to read pixels according to rolling shutter mode and pixel binning with DDS noise reduction.

If UHD mode has been selected in decision step 1904, then the following decision step 1906 can determine if the CMOS image sensor is to be controlled for dDDS or DDS noise cancellation. If the decision step 1906 selects dDDS, then the DPM and/or the DPM module can control the CMOS image sensor to operate in UHD mode with dDDS noise cancellation and rolling shutter. If the decision step 1906 selects DDS, then the DPM and/or the DPM module can control the CMOS image sensor to operate in UHD mode with DDS noise cancellation and rolling shutter.

Although the DPM manages camera features described above include modes for HD, UHD, rolling shutter, and global shutter, other configurations are possible. Camera features can include, but are not limited to, depth of field, dynamic and static resolution, dynamic and static range, sensitivity and F-stop. For instance, the DPM can also be used to implement camera F-stop features with at least 15 F-stops.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

The previous description is provided to enable any person skilled in the art to fully understand the full scope of the disclosure. Modifications to the various exemplary embodiments disclosed herein will be readily apparent to those skilled in the art. Thus, the claims should not be limited to the various aspects of the disclosure described herein, but shall be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in jurisdictions other than the United States, unless the element is expressly recited using the phrase "means for" or, in the case of a method claim, the element is recited using the phrase "step for."

What is claimed is:

1. A image sensing system for providing dynamic pixel management to switch operational modes between high definition (HD) and ultra-high definition (UHD), the image sensor comprising:

a complementary metal oxide semiconductor (CMOS) image sensor including a shared pixel array having a plurality of rows of shared pixel units with each pixel unit comprising at least two photodiodes, a shared floating diffusion and at least two transfer gates configured to control readout of the at least two photodiodes, respectively, wherein the shared pixel array comprises a cross pixel interconnection with the at least two transfer gates of each shared pixel unit including a first transfer gate coupled to a corresponding transfer gate of a shared pixel unit in a row directly above the respective row of the shared pixel unit and a second transfer gate coupled to corresponding transfer gate of a shared pixel unit in a row directly below the respective row of shared pixel unit;

a plurality of vertical and horizontal charge circuitry coupled to the CMOS image sensor and configured to activate the plurality of shared pixel units during image capture based on a set operational mode of the CMOS image sensor;

a dynamic pixel manager configured to switch the operational mode of the CMOS image sensor between a UHD mode and a HD mode in response to a user selection of an image resolution for the image captured by the image sensor;

a UHD mode controller configured to control the plurality of vertical and horizontal charge circuitry to sequentially transfer charge between the at least two photodiodes and the shared floating diffusion of each shared pixel unit when the dynamic pixel manager sets the operational mode of the CMOS image sensor to the UHD mode to individually sample output values of each of the at least two photodiode during the image capture by the image sensor, wherein the UHD mode controller controls the plurality of vertical and horizontal charge circuitry to concurrently sample output values of respective photodiodes in adjacent rows of shared pixel units above or below each other by applying a first common transfer gate control signal to the first transfer gate and the corresponding transfer gate of the shared pixel unit in the row directly above the respective row of the shared pixel unit and a second common transfer gate control signal to the second transfer gate and the corresponding transfer gate of the shared pixel unit in the row directly below the respective row of the shared pixel unit;

an HD mode controller configured to control the plurality of vertical and horizontal charge circuitry to bin charge concurrently between the at least two photodiodes and the shared floating diffusion of each shared pixel unit when the dynamic pixel manager sets the operational mode of the CMOS image sensor to the HD mode to collectively sample output values of each shared pixel unit that combines output values of the at least two photodiodes during the image capture by the image sensor;

a column readout circuit having a plurality of storage capacitors selectively coupled to the shared pixel array that are each configured to store sampled output values of the at least two photodiode of each shared pixel unit during the image capture in the UHD mode and to store sampled output values of each shared pixel unit during the image capture in the HD mode; and an image generating unit configured to generate image data based on the stored sampled output values in the plurality of storage capacitors, the generated image configured to be displayed on a display device.

2. The image sensing system according to claim 1, wherein the plurality of rows of shared pixel units of the shared pixel array comprises a first row of shared pixel units comprising at least one first shared pixel unit and a second row of shared pixel units comprising at least one second shared pixel unit.

3. The image sensing system according to claim 2, wherein the column readout circuit is further configured to read the stored sampled output values from the shared floating diffusion of the at least one first shared pixel unit and the shared floating diffusion of the at least one second shared pixel unit.

4. The image sensing system according to claim 2, wherein the dynamic pixel manager is further configured to control the plurality of vertical and horizontal charge circuitry to concurrently transfer charge between at least one photodiode and the shared floating diffusion of the at least one first shared pixel unit and between at least one photodiode and the shared floating diffusion of the at least one second shared pixel unit when the dynamic pixel manager sets the operational mode of the CMOS image sensor to the HD mode.

5. The image sensing system according to claim 2, wherein the image generating unit comprises a pixel output calculator configured to digitally double sample the at least two photodiodes of each shared pixel unit to reduce noise during the image capture in the UHD mode.

6. The image sensing system according to claim 5, wherein the pixel output calculator digitally double samples the at least two photodiodes of each shared pixel unit by subtracting a dark sample output from a bright sample out of each of the at least two photodiodes, wherein the dark and the bright sample outputs are read sequentially by the column circuit from the shared floating diffusion of the first row.

7. The image sensing system according to claim 2, wherein the UHD mode controller is further configured to control the plurality of vertical and horizontal charge circuitry to control the CMOS image sensor to sample pixel outputs of the shared pixel array according to a rolling shutter exposure sequence when the dynamic pixel manager sets the operational mode of the CMOS image sensor to the UHD mode.

8. The image sensing system according to claim 7, wherein the shared pixel array further comprises a third row of shared pixel units comprising at least one third shared pixel unit, wherein the rolling shutter exposure sequence transfers charge between at least one photodiode and a shared floating diffusion of the at least one third shared pixel unit after charge is transferred between the at least one photodiode and the shared floating diffusion of the at least one first shared pixel unit.

9. A camera for providing dynamic pixel management to switch operational modes between high definition (HD) and ultra-high definition (UHD), the image sensor comprising:
an image sensor including a shared pixel array having a plurality of shared pixels that each comprises at least two photodiodes and a shared floating diffusion, wherein the shared pixel array comprises a cross pixel interconnection with each shared pixel including a first transfer gate coupled to a corresponding transfer gate of a shared pixel unit in a row directly above the respective shared pixel unit and a second transfer gate coupled to corresponding transfer gate of a shared pixel unit in a row directly below the respective shared pixel unit, with each transfer gate configured to control readout of a respective photodiode coupled thereto of the respective shared pixel unit;
a dynamic pixel manager configured to switch an operational mode of the image sensor between a UHD mode and a HD mode based on a selected image resolution for an image capture by the image sensor;
a UHD mode controller configured to control the image sensor to sequentially transfer charge between the at least two photodiodes and the shared floating diffusion of each shared pixel when the dynamic pixel manager sets the operational mode of the image sensor to the UHD mode to individually sample photodiode output values of each of the at least two photodiode during the image capture by the image sensor;
an HD mode controller configured to control the image sensor to bin charge concurrently between the at least two photodiodes and the shared floating diffusion of each shared pixel when the dynamic pixel manager sets the operational mode of the image sensor to the HD mode to collectively sample pixel output values of each shared pixel that combines output values of the at least two photodiodes during the image capture by the image sensor; and
an image generating unit configured to generate image data based on at least one of the individually sampled photodiode output values during the UHD mode and the collectively sampled pixel output values during the HD mode.

10. The camera according to claim 9, further comprising:
a column readout circuit having a plurality of storage capacitors selectively coupled to the shared pixel array that are each configured to store sampled output values of the at least two photodiode of each shared pixel unit during the image capture in the UHD mode and to store sampled output values of each shared pixel unit during the image capture in the HD mode,
wherein the UHD mode controller is configured to control the plurality of vertical and horizontal charge circuitry to concurrently sample output values of respective photodiodes in adjacent rows of shared pixel units above or below each other by applying a first common transfer gate control signal to the first transfer gate and the corresponding transfer gate of the shared pixel unit in the row directly above the respective row of the shared pixel unit and a second common transfer gate control signal to the second transfer gate and the corresponding transfer gate of the shared pixel unit in the row directly below the respective row of the shared pixel unit.

11. The camera according to claim 9, wherein the plurality of rows of shared pixel units of the shared pixel array comprises a first row of shared pixel units comprising at least one first shared pixel unit and a second row of shared pixel units comprising at least one second shared pixel unit.

12. The camera according to claim 11, further comprising a column readout circuit configured to read the stored sampled output values from the shared floating diffusion of the at least one first shared pixel unit and the shared floating diffusion of the at least one second shared pixel unit.

13. The camera according to claim 11, wherein the dynamic pixel manager is further configured to control the image sensor to concurrently transfer charge between at least one photodiode and the shared floating diffusion of the at least one first shared pixel unit and between at least one photodiode and the shared floating diffusion of the at least one second shared pixel unit when the dynamic pixel manager sets the operational mode of the image sensor to the HD mode.

14. The camera according to claim 12, wherein the image generating unit comprises a pixel output calculator configured to digitally double sample the at least two photodiodes of each shared pixel unit to reduce noise during the image capture in the UHD mode.

15. The camera according to claim 14, wherein the pixel output calculator digitally double samples the at least two photodiodes of each shared pixel unit by subtracting a dark sample output from a bright sample out of each of the at least two photodiodes, wherein the dark and the bright sample outputs are read sequentially by the column circuit from the shared floating diffusion of the first row.

16. The camera according to claim 9, wherein the UHD mode controller is further configured to control the image sensor to control the image sensor to sample pixel outputs of the shared pixel array according to a rolling shutter exposure sequence when the dynamic pixel manager sets the operational mode of the image sensor to the UHD mode.

17. The camera according to claim 16, wherein the shared pixel array further comprises a third row of shared pixel units comprising at least one third shared pixel unit, wherein the rolling shutter exposure sequence transfers charge between at least one photodiode and a shared floating diffusion of the at least one third shared pixel unit after charge is transferred between the at least one photodiode and the shared floating diffusion of the at least one first shared pixel unit.

18. A camera for providing dynamic pixel management to switch between operational modes to change image resolution for image capture, the camera comprising:

a camera mode controller configured to switch the camera between a first operational mode and a second operational mode based on a selected image resolution for the camera; and an image sensor configured to individually sample sub-pixels of each pixel in an image sensor when the camera mode controller sets the camera to the first operational mode for an image capture and to collectively sample the sub-pixels of each pixel in the image sensor when the camera mode controller sets the camera to the second operational mode for the image capture, wherein the image sensor comprises a cross pixel interconnection configuration in which at least one pixel is coupled to a first pixel in a row above the at least one pixel and further coupled to a second pixel in a row below the at least one pixel; and a first operational mode controller configured to control the image sensor in the first operational mode to concurrently sample output values of respective sub-pixels in the at least one pixel and the first pixel in the row above the at least one pixel or the second pixel in the row below the at least one pixel.

19. The camera according to claim 18, wherein the first operational mode is an ultra-high definition (UHD) mode and the second operational mode is a high definition (HD) mode.

20. The camera according to claim 19, further comprising a UHD mode controller configured to control the image sensor to sequentially transfer charge between at least two sub-pixels and a shared floating diffusion of each pixel in the image sensor when the camera mode controller sets the camera to the UHD mode to individually sample sub-pixel output values of each of the at least two sub-pixels during the image capture.

21. The camera according to claim 20, further comprising a HD mode controller configured to control the image sensor to bin charge concurrently between the at least two sub-pixels and the shared floating diffusion of each pixel when the camera mode controller sets the camera to the HD mode to collectively sample pixel output values of each shared pixel that combines output values of the at least two sub-pixels during the image capture.

22. The camera according to claim 20, further comprising an image generating unit configured to generate image data based on at least one of the individually sampled sub-pixel output values during the UHD mode and the collectively sampled pixel output values during the HD mode.

23. The camera according to claim 22, further comprising a column readout circuit having a plurality of storage capacitors selectively coupled to the image sensor that are each configured to store sampled output values of the at least two sub-pixels of each pixel during the image capture in the UHD mode and to store sampled output values of each pixel during the image capture in the HD mode.

24. The camera according to claim 22, wherein the image sensor comprises a shared pixel array having a first row of pixels comprising at least one first pixel and a second row of pixels shared pixel units comprising at least one second pixel.

25. The camera according to claim 24, wherein the HD mode controller is further configured to control the image sensor to concurrently transfer charge between at least one sub-pixel and the shared floating diffusion of the at least one first pixel and between at least one sub-pixel and the shared floating diffusion of the at least one second pixel when the camera mode controller sets the operational mode of the camera to the HD mode.

26. The camera according to claim 22, wherein the image generating unit comprises a pixel output calculator configured to digitally double sample the at least two sub-pixels of each pixel to reduce noise during the image capture in the UHD mode.

27. The camera according to claim 26, wherein the pixel output calculator digitally double samples the at least two sub-pixels of each pixel by subtracting a dark sample output from a bright sample output of each of the at least two sub-pixels, wherein the dark and the bright sample outputs are read sequentially by the column circuit from the shared floating diffusion of the first row.

28. The camera according to claim 20, wherein the UHD mode controller is further configured to control the image sensor to control the image sensor to sample pixel outputs of the shared pixel array according to a rolling shutter exposure sequence when the camera mode controller sets the operational mode of the camera to the UHD mode.

29. The camera according to claim 28, wherein the shared pixel array further comprises a third row of pixels comprising at least one third pixel, wherein the rolling shutter exposure sequence transfers charge between at least one sub-pixel and a shared floating diffusion of the at least one third pixel after charge is transferred between the at least one sub-pixel and the shared floating diffusion of the at least one first pixel.

* * * * *